US010065527B2

(12) United States Patent
Honda

(10) Patent No.: US 10,065,527 B2
(45) Date of Patent: Sep. 4, 2018

(54) CONTROL SYSTEM AND CONTROL METHOD FOR DRIVING DEVICE, AND RECORDING MEDIUM

(71) Applicant: HONDA MOTOR CO., LTD., Tokyo (JP)

(72) Inventor: Tomokazu Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 15/120,639

(22) PCT Filed: Jan. 13, 2016

(86) PCT No.: PCT/JP2016/050771
§ 371 (c)(1),
(2) Date: Aug. 22, 2016

(87) PCT Pub. No.: WO2016/114282
PCT Pub. Date: Jul. 21, 2016

(65) Prior Publication Data
US 2017/0008422 A1    Jan. 12, 2017

(30) Foreign Application Priority Data

Jan. 13, 2015 (JP) .................................. 2015-004023

(51) Int. Cl.
*B60K 6/52* (2007.10)
*B60K 6/54* (2007.10)
(Continued)

(52) U.S. Cl.
CPC ............ *B60L 15/2036* (2013.01); *B60K 1/02* (2013.01); *B60K 6/52* (2013.01); *B60K 17/348* (2013.01);
(Continued)

(58) Field of Classification Search
CPC ............ B60L 15/2036; B60L 2240/22; B60L 2240/423; B60K 1/02; B60K 17/348;
(Continued)

(56) References Cited

U.S. PATENT DOCUMENTS 8,224,526 B2 *   7/2012   Miyajima ............. B60T 8/1755
                                                340/441
2013/0261863 A1 * 10/2013  Noguchi .................. B60K 1/02
                                                701/22

FOREIGN PATENT DOCUMENTS

JP    62-205824 A    9/1987
JP    2009-184575 A  8/2009
(Continued)

OTHER PUBLICATIONS

International Search Report dated Mar. 15, 2016, issued in counterpart International Application No. PCT/JP2016/050771 (2 pages).

*Primary Examiner* — Alan D Hutchinson
(74) *Attorney, Agent, or Firm* — Westerman, Hattori, Daniels & Adrian, LLP

(57) ABSTRACT

In a control system and control method for a driving device, opposite distribution control is performed (e.g., steps 1, 4 to 7), whereby a left driving force and a right driving force are controlled such that a yaw moment in a direction opposite to a turning direction of the vehicle acts on the vehicle, whereby a left-right driving force difference is generated which is a difference between the left driving force and the right driving force. During performance of the opposite distribution control, when deceleration of the vehicle is obtained, limit control is performed (e.g., step 8), whereby the left driving force and the right driving force are controlled such that a change in the left-right driving force difference becomes smaller than a change in a left-right (Continued)

driving force sum, which is the sum of the left driving force and the right driving force.

10 Claims, 15 Drawing Sheets

(51) Int. Cl.
| | |
|---|---|
| *B60L 15/20* | (2006.01) |
| *B60W 10/08* | (2006.01) |
| *B60W 20/15* | (2016.01) |
| *B60W 40/114* | (2012.01) |
| *B60W 30/045* | (2012.01) |
| *B60K 1/02* | (2006.01) |
| *B60K 17/348* | (2006.01) |
| *B60K 23/04* | (2006.01) |

(52) U.S. Cl.
CPC ........... *B60K 23/04* (2013.01); *B60W 30/045* (2013.01); *B60W 40/114* (2013.01); *B60K 2023/043* (2013.01); *B60L 2240/22* (2013.01); *B60L 2240/32* (2013.01); *B60L 2240/423* (2013.01); *B60L 2260/28* (2013.01); *Y02T 10/645* (2013.01); *Y02T 10/72* (2013.01); *Y02T 10/7275* (2013.01)

(58) Field of Classification Search
CPC .... B60K 23/04; B60K 6/52; B60K 2023/043; B60W 30/045; B60W 40/114
See application file for complete search history.

(56) References Cited

FOREIGN PATENT DOCUMENTS

| | | |
|---|---|---|
| JP | 2010-162911 A | 7/2010 |
| JP | 2013-212726 A | 10/2013 |
| WO | 2013/005783 A1 | 1/2013 |

\* cited by examiner

CONTROL SYSTEM AND CONTROL METHOD FOR DRIVING DEVICE, AND RECORDING MEDIUM

TECHNICAL FIELD

The present invention relates to a control system and a control method for a driving device that is capable of adjusting driving forces of left and right driving parts for propelling a vehicle, thereby changing a left-right driving force sum, which is a sum of the driving forces of the left and right driving parts, and a left-right driving force difference, which is a difference between the driving forces of the left and right driving parts, independently of each other, and a recording medium.

BACKGROUND ART

Conventionally, as a control system of this kind, there has been known one disclosed e.g. in PTL 1. In this control system, during turning of a vehicle, when the speed of the vehicle is low to medium, which is lower than a predetermined vehicle speed, torques of left and right wheels of the vehicle are controlled such that a yaw moment (absolute value) of the vehicle is increased, whereas when the vehicle speed is high, which is not lower than the predetermined vehicle speed, the torques of the left and right wheels are controlled such that the yaw moment (absolute value) of the vehicle is reduced. Thus, in the conventional control system, turnability of the vehicle is improved.

CITATION LIST

Patent Literature

[PTL 1] Japanese Laid-Open Patent Publication (Kokai) No. S62-205824

SUMMARY OF INVENTION

Technical Problem

As described above, in the conventional control system, during turning of the vehicle, when the vehicle speed is low to medium, the torques of the left and right wheels are controlled such that the yaw moment is increased, whereas when the vehicle speed is high, the torques of the left and right wheels are controlled such that the yaw moment is reduced. Therefore, for example, in a case where the vehicle is turning and also is traveling at high speed, when the vehicle speed is made low to medium e.g. by operation of a brake of the vehicle, there is a fear that the following inconveniences occur: In this case, the torques of the left and right wheels are controlled from a state being controlled such that the yaw moment, is reduced, such that the yaw moment is increased, whereby the yaw moment is drastically changed, which can in turn cause an unstable behavior of the vehicle.

The present invention has been made to provide a solution to such a problem described above, and an object thereof is to provide a control system and a control method for a driving device which is capable of suppressing a change in the yaw moment of a vehicle during deceleration of the vehicle during turning thereof, which in turn makes it possible to stabilize a behavior of the vehicle, and a recording medium.

Solution to Problem

To attain the above object, the invention according to claim 1 is a control system 1 for a driving device (rear wheel drive device DRS) that is capable of adjusting a left driving force, which is a driving force of a left driving part (left rear wheel WRL) for propelling a vehicle (vehicle V in the embodiment (hereinafter, the same applies throughout this section)), arranged on a left side of the vehicle with respect to a traveling direction of the vehicle, and a right driving force, which is a driving force of a right driving part (right rear wheel WRR) for propelling the vehicle, arranged on a right side of the vehicle with respect to the traveling direction of the vehicle, thereby changing a left-right driving force sum (left-right torque sum TTWLR), which is a sum of the left driving force and the right driving force, and a left-right driving force difference (left-right torque difference ΔTWLR), which is a difference between the left driving force and the right driving force, independently of each other, the control system comprising a controller (ECU 2, steps 1, 4 to 7) for performing an opposite distribution control for generating the left-right driving force difference by controlling the left driving force and the right driving force via the driving device such that a yaw moment in a direction opposite to a turning direction of the vehicle acts on the vehicle, and a deceleration obtainer (brake switch 26, ECU 2) for obtaining deceleration of the vehicle, wherein during performance of the opposite distribution control (YES to step 42), when the deceleration of the vehicle is obtained (YES to step 43, YES to step 71), the controller performs a limit control for controlling the left driving force and the right driving force such that a change in the left-right driving force difference becomes smaller than a change in the left-right driving force sum (step 45, YES to step 2, step 8, YES to step 61, step 62).

With this configuration, the opposite distribution control is performed for generating the left-right driving force difference by controlling the left driving force and the right driving force via the driving device such that the yaw moment in the direction opposite to the turning direction of the vehicle acts on the vehicle. With this control, by reducing the yaw moment during turning of the vehicle, it is possible to stabilize a behavior of the vehicle. Further, during performance of the opposite distribution control, when the deceleration of the vehicle is obtained, the limit control is performed for controlling the left driving force and the right driving force such that the change in the left-right driving force difference becomes smaller than the change in the left-right driving force sum.

Here, a propelling force for propelling the vehicle is changed according to the change in the above-mentioned left-right driving force sum, and further the yaw moment of the vehicle is changed according to the change in the left-right driving force difference. As described above, during performance of the opposite distribution control, when the deceleration of the vehicle is obtained, the left driving force and the right driving force are controlled such that the change in the left-right driving force difference becomes smaller than the change in the left-right driving force sum. With this control, it is possible to suppress a change in the yaw moment of the vehicle when the vehicle is being decelerated during turning thereof, which in turn makes it possible to stabilize the behavior of the vehicle. Further, when the left-right driving force difference is being generated such that a yaw moment in the same direction as the turning direction of the vehicle acts on the vehicle, i.e. when the turning of the vehicle is being assisted, the limit control is not performed, so that excessive turning of the vehicle is prevented from being caused by unnecessarily maintaining the turning assistance. Further, in this case, simply by controlling the left driving force and the right driving force, it is possible to stabilize the behavior of the vehicle without determining whether or not the behavior of the vehicle is stable.

Note that in the present invention, "difference between the left driving force and the right driving force" refers to an amount including the difference between the left driving force and the right driving force, or a ratio therebetween, as well. Further, "obtaining" is a concept including detection, calculation, estimation, and also prediction, and "change" is a concept including a rate of change, and even an amount of change.

The invention according to claim 2 is the control system 1 for a driving device according to claim 1, further comprising a speed obtainer (vehicle speed sensor 21) for obtaining a traveling speed of the vehicle, and wherein during performance of the opposite distribution control, in a case where the obtained traveling speed (vehicle speed VP) of the vehicle is not lower than a predetermined speed (high vehicle speed VPHI) (YES to step 44), the controller starts the limit control (step 45, YES to step 2, step 8, YES to step 61, step 62) when the deceleration of the vehicle is obtained.

With this configuration, during performance of the opposite distribution control, in the case where the obtained traveling speed of the vehicle is not lower than the predetermined speed, the limit control is started when the deceleration of the vehicle is obtained. During performance of the opposite distribution control in a case Where the traveling speed of the vehicle is relatively high, if the left-right driving force difference is largely changed, there is a fear that the behavior of the vehicle becomes very unstable. Therefore, by starting the limit control in a situation as mentioned above, it is possible to effectively obtain the advantageous effect provided by the invention according to claim 1, that is, the advantageous effect that the behavior of the vehicle can be stabilized when the vehicle is being decelerated during turning thereof. Furthermore, when the traveling speed of the vehicle is lower than the predetermined speed, it is possible to freely control the left-right driving force difference without starting the limit control, so that it is possible to cause the yaw moment in the same direction as the turning direction of the vehicle to act on the vehicle.

The invention according to claim 3 is the control system 1 for a driving device according to claim 1, wherein the controller controls the left driving force and the right driving force, as the limit control, such that the left-right driving force difference is held substantially constant (step 8).

With this configuration, during performance of the limit control, the left driving force and the right driving force are controlled such that the left-right driving force difference is held substantially constant. With this control, it is possible to positively suppress a change in the yaw moment of the vehicle when the vehicle is being decelerated during turning thereof, which in turn makes it possible to positively stabilize the behavior of the vehicle.

The invention according to claim 4 is the control system 1 for a driving device according to claim 1, wherein the deceleration obtainer further obtains termination of the deceleration of the vehicle or acceleration of the vehicle, and wherein the controller continues the limit control until the termination of the deceleration of the vehicle or the acceleration of the vehicle is obtained (NO to step 47, NO to step 72, step 48).

With this configuration, the limit control is continued until the termination of the deceleration of the vehicle or the acceleration of the vehicle is obtained. The limit control is thus continued during time from the start of the deceleration of the vehicle during turning thereof to the end of the deceleration, it is possible to stabilize the behavior of the vehicle.

The invention according to claim 5 is the control system 1 for a driving device according to claim 1, further comprising a movement state obtainer (vehicle speed sensor 21, steering angle sensor 22, lateral acceleration sensor 23, yaw moment sensor 24) for obtaining a movement state of the vehicle, and wherein after termination of the limit control (NO to step 47, NO to step 72, steps 48, 49, YES to step 3), the controller controls the left driving force and the right driving force such that the left driving force and the right driving force are progressively returned from values (immediately preceding value TWLOBJZ, immediately preceding value TWROBJZ) to which the left driving force and the right driving force have been controlled at an end of the limit control to values (left wheel provisional target torque TWLPRO, right wheel provisional target torque TWRPRO) to which the left driving force and the right driving force are controlled by normal control according to the obtained movement state of the vehicle (step 9).

With this configuration, after termination of the limit control, the left driving force and the right driving force are controlled such that the left and right driving forces are progressively, not suddenly, returned from the values to which the left and right driving forces have been controlled at the end of the limit control to the values to which the left and right driving forces are controlled by the normal control according to the obtained movement state of the vehicle. This makes it possible to smoothly shift the limit control to the normal control without drastically changing the left-right driving force difference.

The invention according to claim 6 is the control system 1 for a driving device according to claim 1, wherein the vehicle is a vehicle V, and wherein the left and right driving parts are left and right wheels (left and right rear wheels WRL, WRR) of the vehicle.

With this configuration, in the vehicle having the left and right wheels, it is possible to obtain the advantageous effect described in the description of the invention according to claim 1.

The invention according to claim 7 is the control system 1 for a driving device according to claim 1, wherein the driving device includes a left rotating electric machine (first rear motor 41) and a right rotating electric machine (second rear motor 61) connected to the left driving part and the right driving part, respectively.

With this configuration, by controlling the left rotating electric machine and the right rotating electric machine, it is possible to control the left driving force and the right driving force independently of each other, and hence it is possible to effectively obtain the advantageous effect provided by the invention according to claim 1, that is, the advantageous effect that the behavior of the vehicle can be stabilized when the vehicle is being decelerated during turning thereof.

To attain the above object, the invention according to claim 8 is a control system 1 for a driving device (rear wheel drive device DRS) that is capable of adjusting a left driving force, which is a driving force of a left driving part (left rear wheel WRL) for propelling a vehicle (vehicle V in the embodiment (hereinafter, the same applies throughout this section)), arranged on a left side of the vehicle with respect to a traveling direction of the vehicle, and a right driving force, which is a driving force of a right driving part (right rear wheel WRR) for propelling the vehicle, arranged on a right side of the vehicle with respect to the traveling direction of the vehicle, thereby changing a left-right driving force sum (left-right torque sum TTWLR), which is a sum of the left driving force and the right driving force, and a left-right driving force difference (left-right torque difference ΔTWLR), which is a difference between the left driving force and the right driving force, independently of each other, the control system comprising a control parameter obtainer (vehicle speed sensor 21, steering angle sensor 22, lateral acceleration sensor 23, yaw moment sensor 24, accelerator pedal opening sensor 25) for obtaining a control parameter indicative of at least one of a movement state of the vehicle and a demand from an operator of the vehicle, a target value calculator (ECU 2, steps 21, 23) for calculating a left-right difference target value (target torque difference ΔTT), which is a target value of the left-right, driving force difference, and a left-right sum target value (target torque sum TRT), which is a target value of the left-right driving force sum, based on the obtained control parameter (vehicle speed VP, steering angle θ, lateral acceleration GL, yaw moment YM, accelerator pedal opening AP), and a controller (ECU 2, steps 24 to 31, steps 4 to 7) for controlling the left driving force and the right driving force according to the calculated left-right difference target value and left-right sum target value, wherein the controller performs, according to the left-right difference target value, an opposite distribution control for generating the left-right driving force difference by controlling the left driving force and the right driving force via the driving device such that a yaw moment in a direction driver to a turning direction of the vehicle acts on the vehicle, and wherein during performance of the opposite distribution control (YES to step 42), when both a change in the left-right difference target value and a change in the left-right sum target value are obtained (YES to step 71), the controller performs a limit control for controlling the left driving force and the right driving force such that a change in the left-right driving force difference becomes smaller than a change in the left-right driving force sum (step 45, YES to step 2, step 8, YES to step 61, step 62).

With this configuration, the control parameter indicative of at least one of the movement state of the vehicle and the demand from the operator of the vehicle is obtained, the left-right difference target value, which is the target value of the left-right driving force difference, and the left-right sum target value, which is the target value of the left-right driving force sum, are calculated based on the obtained control parameter, and the left driving force and the right driving force are controlled according to the calculated left-right difference target value and left-right sum target value. Further, the opposite distribution control is performed for generating the left-right driving force difference by controlling the left driving force and the right driving force via the driving device according to the left-right difference target value such that the yaw moment in the direction opposite to the turning direction of the vehicle acts on the vehicle. With this control, similarly to the invention according to claim 1, by reducing the yaw moment during turning of the vehicle, it is possible to stabilize the behavior of the vehicle.

Further, during performance of the opposite distribution control, when both the change in the left-right difference target value and the change in the left-right sum target value are obtained, the limit control is performed for controlling the left driving force and the right driving force such that the change in the left-right driving force difference becomes smaller than the change in the left-right driving force sum.

As described above, the propelling force for propelling the vehicle is changed according to the change in the left-right driving force sum, and hence the fact that the change in the left-right sum target value, which is the target value of the left-right driving force sum, is obtained indicates that the traveling speed of the vehicle is changing or in a changing state, that is, the vehicle is decelerated or accelerated or in a state where deceleration or acceleration of the vehicle is performed. Therefore, by performing the limit control as described above, similar to the invention according to claim 1, it is possible to suppress a change in the yaw moment of the vehicle when the vehicle is being decelerated during turning thereof, which in turn makes it possible to stabilize the behavior of the vehicle. In this case, simply by controlling the left driving force and the right driving force, it is possible to stabilize the behavior of the vehicle without determining whether or not the behavior of the vehicle is stable.

To attain the above object, the invention according to claim 9 is a control method for a driving device (rear wheel drive device DRS) that is capable of adjusting a left driving force, which is a driving force of a left driving part (left rear wheel WRL) for propelling a vehicle (vehicle V in the embodiment (hereinafter, the same applies throughout this section)), arranged on a left side of the vehicle with respect to a traveling direction of the vehicle, and a right driving force, which is a driving force of a right driving part (right rear wheel WRR) for propelling the vehicle, arranged on a right side of the vehicle with respect to the traveling direction of the vehicle, thereby changing a left-right driving force sum (left-right torque sum TTWLR), which is a sum of the left driving force and the right driving force, and a left-right driving force difference (left-right torque difference ΔTWLR), which is a difference between the left driving force and the right driving force, independently of each other, the control method comprising a step (steps 1, 4 to 7) of performing an opposite distribution control for generating the left-right driving force difference by controlling the left driving force and the right driving force via the driving device such that a yaw moment in a direction opposite to a turning direction of the vehicle acts on the vehicle, a step (steps 43, 47, steps 71, 72) of obtaining deceleration of the vehicle, and a step (step 45, YES to step 2, step 8, YES to step 61, step 62) of performing, during performance of the opposite distribution control (YES to step 42), when the deceleration of the vehicle is obtained (YES to step 43, YES to step 71), a limit control for controlling the left driving force and the right driving force such that a change in the left-right driving force difference becomes smaller than a change in the left-right driving force sum.

As is apparent from the above description, the invention according to claim 9 is obtained by rewriting the invention of the control system according to claim 1 into the invention of the control method without substantially changing the contents of the invention according to claim 1. Therefore, it is possible to obtain the same advantageous effects as provided by the invention according to claim 1, that is, the stabilization of the behavior of the vehicle when the vehicle is being decelerated during turning thereof.

To attain the above object, the invention according to claim 10 is a recording medium (ROM 2a) in which is recorded a program for causing a computer (ECU 2) to perform a control process for controlling a driving device (rear wheel drive device DRS) that is capable of adjusting a left driving force, which is a driving force of a left driving part (left rear wheel WRL) for propelling a vehicle (vehicle V in the embodiment (hereinafter, the same applies throughout this section)), arranged on a left side of the vehicle with respect to a traveling direction of the vehicle, and a right driving force, which is a driving force of a right driving part (right rear wheel WRR) for propelling the vehicle, arranged on a right side of the vehicle with respect to the traveling direction of the vehicle, thereby changing a left-right driving force sum (left-right torque sum TTWLR), which is a sum of the left driving force and the right driving force, and a left-right driving force difference (left-right torque difference ΔTWLR), which is a difference between the left driving force and the right driving force, independently of each other, the control process comprising a step (steps 1, 4 to 7) of performing an opposite distribution control for generating the left-right driving force difference by controlling the left driving force and the right driving force via the driving device such that a yaw moment in a direction opposite to a turning direction of the vehicle acts on the vehicle, a step (steps 43, 47, steps 71, 72) of obtaining deceleration of the vehicle, and a step (step 45, YES to step 2, step 8, YES to step 61, step 62) of performing, during performance of the opposite distribution control (YES to step 42), when the deceleration of the vehicle is obtained (YES to step 43, YES to step 71), a limit control for controlling the left driving force and the right driving force such that a change in the left-right driving force difference becomes smaller than a change in the left-right driving force sum.

As is apparent from the above description, the invention according to claim 10 is obtained by rewriting the invention of the control system according to claim 1 into the invention of the recording medium for a computer program without substantially changing the contents of the invention according to claim 1. Therefore, it is possible to obtain the same advantageous effects as provided by the invention according to claim 1, that is, the stabilization of the behavior of the vehicle when the vehicle is being decelerated during turning thereof.

DESCRIPTION OF EMBODIMENTS

Figure 1:
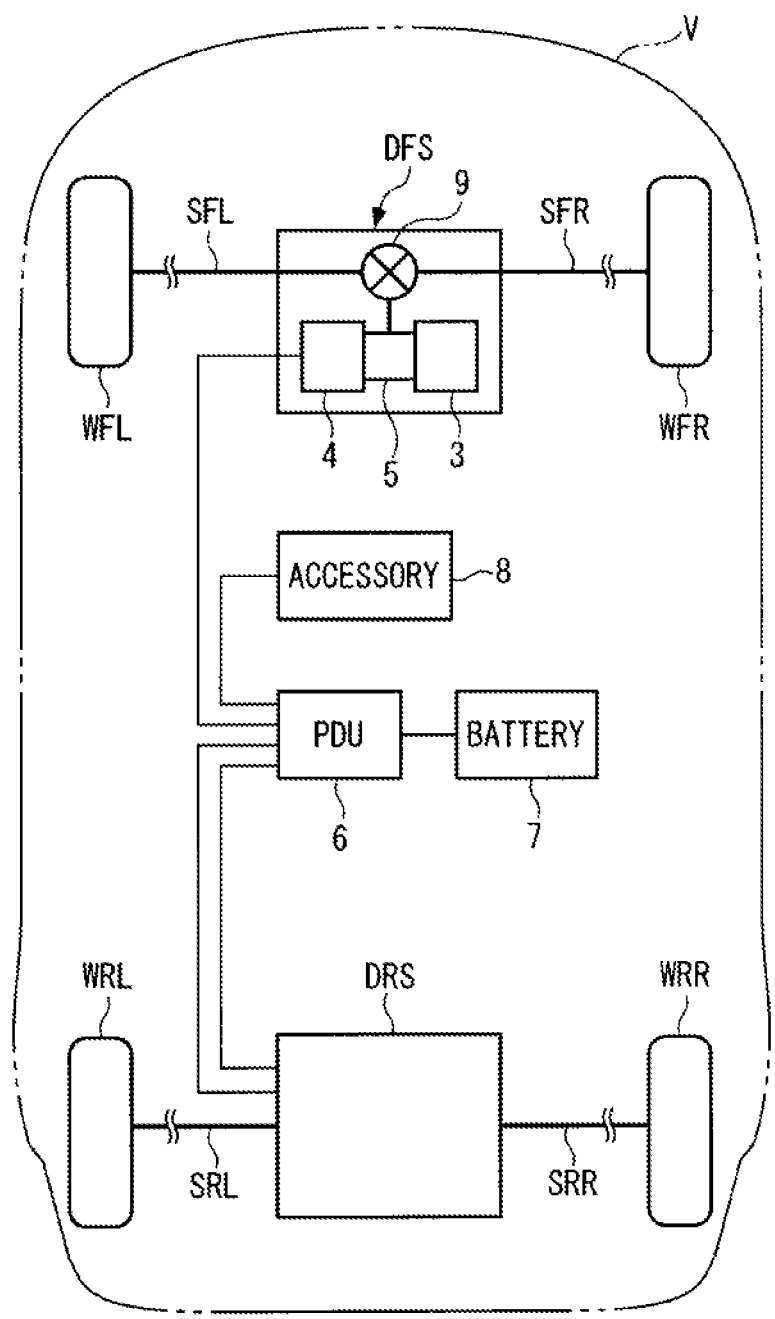
FIG. 1 A schematic diagram of a hybrid vehicle to which a control system according to the present invention is applied.

The invention will now be described in detail with reference to drawings showing a preferred embodiment thereof. A vehicle V shown in FIG. 1 is a four-wheel vehicle having left and right front wheels WFL and WFR and left and right rear wheels WRL and WRR. A front wheel drive device DFS for driving the front wheels WFL and WFR and a rear wheel drive device DRS for driving the rear wheels WRL and WRR are installed on the vehicle V. Hereinafter, the left and right front wheels WFL and WFR and the left and right rear wheels WRL and WRR are collectively referred to as the "front wheels WFL and WFR" and the "rear wheels WRL and WRR", respectively.

The front wheel drive device DFS is the same as one disclosed in Japanese Patent Publication No. 5362792 by the present applicant, and hence a brief description will be given of the configuration and operation thereof hereinafter. The front wheel drive device DFS includes an internal combustion engine (hereinafter referred to as the "engine") 3, a front motor 4 formed by an electric motor capable of generating electric power, and a transmission 5 for transmitting motive powers from the engine 3 and the front motor 4 to the front wheels WFL and WFR, while changing the speeds of the motive powers.

The engine 3 is a gasoline engine having a plurality of cylinders, and an intake air amount, a fuel injection amount, fuel injection timing, and ignition timing thereof are controlled by an ECU 2, described hereinafter, of a control system 1 shown in FIG. 3. As is widely known, the intake air amount is controlled via a throttle valve (not shown), the fuel injection amount and the fuel injection timing are controlled via a fuel injection valve (not shown), and the ignition timing is controlled via a spark plug (not shown).

The front motor 4 is a brushless DC motor, and includes a stator (not shown) comprised of three-phase coils, and a rotor (not shown) comprised of magnets. The stator is electrically connected to a chargeable and dischargeable battery 7 via a power drive unit (hereinafter referred to as the "PDU") 6. The PDU 6 is formed by an electric circuit comprised of an inverter, and is electrically connected to the ECU 2 (see FIG. 3).

In the front motor 4, when the ECU 2 controls the PDU 6 to thereby supply electric power from the battery 7 to the stator via the PDU 6, this causes the electric power to be converted to motive power, and the motive power rotates the rotor (powering). In this case, the electric power supplied to the stator is controlled, whereby the motive power of the rotor is controlled. Further, when the rotor is being rotated by input of motive power in a state where supply of the electric power to the stator is stopped, the ECU 2 controls the PDU 6, whereby the motive power input to the rotor is converted to electric power, to perform power generation, and generated electric power is charged into the battery 7, or is supplied to first and second rear motors 41 and 61, described hereinafter, of the rear wheel drive device DRS.

Further, an accessory 8 formed by a compressor of an air conditioner and a 12-V battery (not shown) are mounted on the vehicle V. The accessory 8 is electrically connected to a stator of the front motor 4 and the battery 7 via the PDU 6, and the 12-V battery is electrically connected to the stator of the front motor 4 and the battery 7 via a DC/DC converter (not shown). Electric power generated by the front motor 4 and electric power of the battery 7 are supplied to the accessory 8. The electric power supplied to the accessory 8 is controlled by the ECU 2 via the PDU 6.

The above-mentioned transmission 5 is a so-called dual clutch transmission. Although not shown, the transmission 5 includes a first input shaft connected to the engine 3 via a first clutch, a planetary gear unit arranged between the front motor 4 and the first input shaft, a second input shaft connected to the engine 3 via a second clutch, an output shaft parallel to the first and second input shafts, a plurality of input gears rotatably provided on the first and second input shafts, a plurality of output gears integrally formed on the output shaft and in mesh with the plurality of input gears, and a synchronizer which selectively connects one of the plurality of input gears to the first or second input shaft and sets a gear position formed by the input gear and an output gear in mesh with the input gear.

With the above arrangement, the ECU 2 controls the first and second clutches, the synchronizer, and so forth, whereby the motive power of the engine 3 (hereinafter referred to as the "engine motive power") and/or the motive power of the front motor 4 are/is input to the first input shaft, or the engine motive power alone is input to the second input shaft, selectively, according to the engaged/disengaged states of the first and second clutches. The input motive power is output to the output shaft in a state changed in speed at a predetermined transmission gear ratio of a gear position set by the synchronizer, and is further transmitted to the left and right front wheels WFL and WFR via a final reduction gear box 9 and left and right front drive shafts SFL and SFR.

As shown in FI. 2, the above-mentioned rear wheel drive device DRS includes the first rear motor 41, a first planetary gear unit 51, the second rear motor 61, and a second planetary gear unit 71. These first rear motor 41, first planetary gear unit 51, second planetary gear unit 71, and second rear motor 61 are arranged between the left and right rear wheels WRL and WRR in the mentioned order from the left, coaxially with left and right rear drive shafts SRL and SRR. The left and right rear drive shafts SRL and SRR are rotatably supported by bearings (not shown), and one ends thereof are connected to the left and right rear wheels WRL and WRR, respectively.

Similar to the front motor 4, the above-mentioned first rear motor 41 is a brushless DC motor formed as a so-called motor generator, and includes a stator 42 and a rotatable rotor 43. The stator 42 is mounted on a casing CA fixed to the vehicle V, and is electrically connected to the stator of the front motor 4 and the battery 7 via the above-mentioned PDU 6. The rotor 43 is integrally mounted on a hollow cylindrical rotating shaft 44. The rotating shaft 44 is relatively rotatably disposed outside the left rear drive shaft SRL, and is rotatably supported by a bearing (not shown).

In the first rear motor 41, when the ECU 2 controls the PDU 6 to thereby supply electric power from the battery 7 and electric power generated by the front motor 4 to the stator 42 via the PDU 6, this causes the electric power to be converted to motive power, and the motive power rotates the rotor 43 (powering). In this case, the electric power supplied to the stator 42 is controlled, whereby the motive power of the rotor 43 is controlled. Further, when the rotor 43 is being rotated by input of motive power in a state where supply of the electric power to the stator 42 is stopped, the ECU 2 controls the PDU 6, whereby the motive power input to the rotor 43 is converted to electric power to perform power generation (regeneration), and generated electric power is charged into the battery 7.

The first planetary gear unit 51 is for transmitting the motive power of the first rear motor 41 to the left rear wheel WRL while reducing the speed thereof, and includes a first sun gear 52, a first ring gear 53, double pinion gears 54, and a first carrier 55. The first sun gear 52 is integrally mounted on the above-described rotating shaft 44, and is rotatable in unison with the rotor 43 of the first rear motor 41. The first ring gear 53 has a tooth number larger than the first sun gear 52, and is integrally mounted on a hollow cylindrical rotating shaft 81. The rotating shaft 81 is rotatably supported by a bearing (not shown). The double pinion gears 54 each integrally include a first pinion gear 54*a* and a second pinion gear 54*b*, and the number of the double pinion gears 54 is three (only two of which are shown). Further, each double pinion gear 54 is rotatably supported on the first carrier 55, with the first pinion gear 54*a* thereof being in mesh with the first sun gear 52 and the second pinion gear 54*b* thereof being in mesh with the first ring gear 53, respectively. The first carrier 55 is integrally mounted on the other end of the left rear drive shaft SRL, and is rotatable in unison with the left rear drive shaft SRL.

The second rear motor 61 and the second planetary gear unit 71 are constructed similarly to the first rear motor 41 and the first planetary gear unit 51, respectively, so that hereafter, a brief description will be given of the constructions thereof. The second rear motor 61 and the second planetary gear unit 71 are provided symmetrical with the first rear motor 41 and the first planetary gear unit 51, with a one-way clutch 83, referred to hereinafter, in the center. A stator 62 of the second rear motor 61 is mounted on the above-mentioned casing CA, and is electrically connected via the PDU 6 to the stator of the front motor 4, the battery 7, and the stator 42 of the first rear motor 41. Further, a rotor 63 of the second rear motor 61 is integrally mounted on a hollow cylindrical rotating shaft 64. The rotating shaft 64 is relatively rotatably disposed outside the right rear drive shaft SRR, and is rotatably supported by a bearing (not shown).

In the second rear motor 61, when the ECU 2 controls the PDU 6 to thereby supply electric power from the battery 7 and electric power generated by the front motor 4 to the stator 62 via the PDU 6, this causes the electric power to be converted to motive power, and the motive power rotates the rotor 63 (powering). In this case, the electric power supplied to the stator 62 is controlled, whereby the motive power of the rotor 63 is controlled. Further, when the rotor 63 is being rotated by input of motive power in a state where supply of the electric power to the stator 62 is stopped, the ECU 2 controls the PDU 6, whereby the motive power input to the rotor 63 is converted to electric power to perform power generation (regeneration), and generated electric power is charged into the battery 7.

The second planetary gear unit 71 is for transmitting the motive power of the second rear motor 61 to the right rear wheel WRR while reducing the speed thereof, and includes a second sun gear 72, a second ring gear 73, double pinion gears 74, and a second carrier 75. The tooth numbers of the second sun gear 72, the second ring gear 73, and each double pinion gear 74 are set to be the same as those of the first sun gear 52, the first ring gear 53, and each pinion gear 54, respectively.

The second sun gear 72 is integrally mounted on the above-mentioned rotating shaft 64, and is rotatable in unison with the rotor 63 of the second rear motor 61. The second ring gear 73 has a tooth number larger than the second sun gear 72, and is integrally mounted on a hollow cylindrical rotating shaft 82. The rotating shaft 82 is rotatably supported by a bearing (not shown), and is axially opposed to the above-mentioned rotating shaft 81 with a slight spacing from the above-described rotating shaft 81. Each double pinion gear 74 is rotatably supported on the second carrier 75, with a first pinion gear 74a thereof being in mesh with the second sun gear 72 and a second pinion gear 74b thereof being in mesh with the second ring gear 73, respectively. The second carrier 75 is integrally mounted on the other end of the right rear drive shaft SRR, and is rotatable in unison with the right rear drive shaft SRR.

Figure 2:
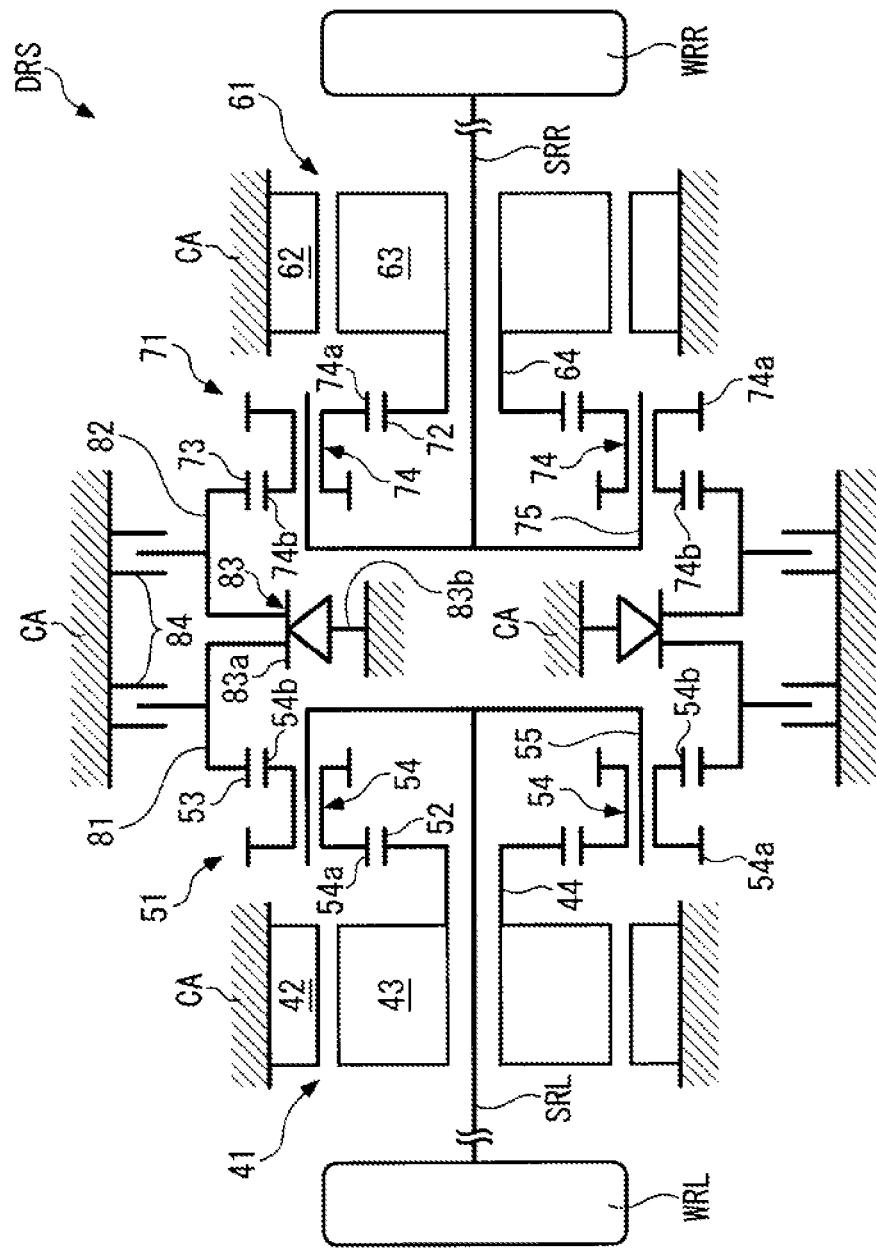
FIG. 2 A schematic skeleton diagram of a rear wheel drive device.

The rear wheel drive device DRS further includes the one-way clutch 83 and a hydraulic brake 84. The one-way clutch 83 includes an inner race 83a and an outer race 83b, and is arranged between the first and second planetary gear units 51 and 71. Note that in FIG. 2, the inner race 83a is illustrated at an outer location, and the outer race 83b is illustrated at an inner location, respectively, for convenience of illustration. The inner race 83a is engaged with the above-mentioned rotating shafts 81 and 82, whereby the inner race 83a, the rotating shafts 81 and 82, and the first and second ring gears 53 and 73 are made rotatable in unison with each other. Further, the outer race 83b is mounted on the casing CA. When motive power for causing the rotating shafts 81 and 82 to perform opposite rotation is transmitted to the rotating shafts 81 and 82, the one-way clutch 83 connects the rotating shafts 81 and 82 to the casing CA to thereby block the opposite rotations of the rotating shafts 81 and 82, and the first and second ring gears 53 and 73, whereas when motive power for causing the rotating shafts 81 and 82 to perform normal rotation is transmitted to the rotating shafts 81 and 82, the one-way clutch 83 disconnects between the rotating shafts 81 and 82 and the casing CA to thereby allow the normal rotations of the rotating shafts 81 and 82, and the first and second ring gears 53 and 73.

The hydraulic brake 84 is formed by a multi-plate clutch, and are attached to the casing CA and the rotating shafts 81 and 82, and are arranged around the outer peripheries of the first and second planetary gear units 51 and 71. The hydraulic brake 84 is controlled by the ECU 2, to thereby selectively perform a braking operation for braking the first and second ring gears 53 and 73 and a rotation allowing operation for allowing the rotations of the first and second ring gears 53 and 73. The braking force of the hydraulic brake 84 is controlled by the ECU 2.

Figure 3:
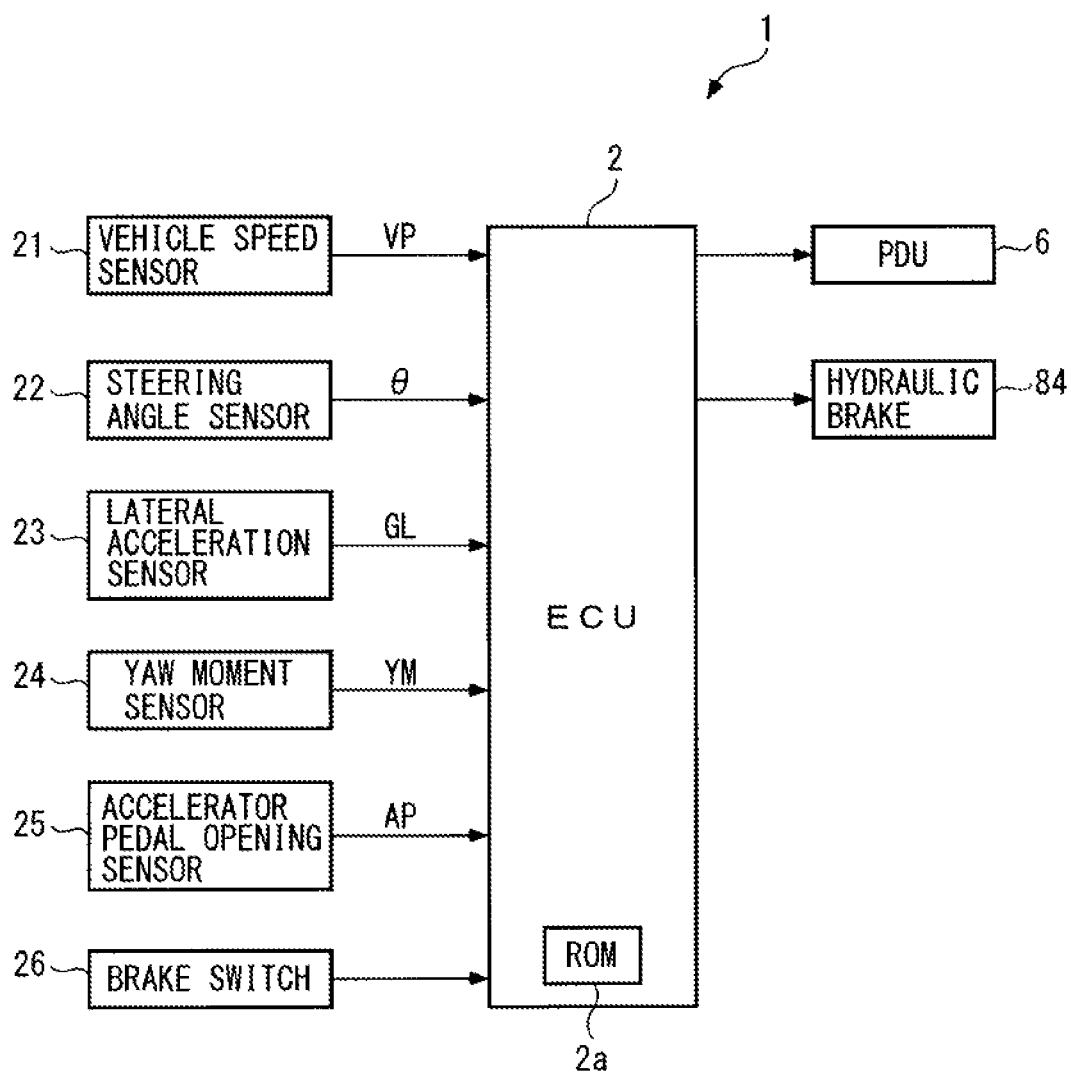
FIG. 3 A block diagram of an ECU and so forth of the control system.

Further, as shown in FIG. 3, to the ECU 2, a vehicle speed VP of the vehicle V is input from a vehicle speed sensor 21, a detection signal indicative of a steering angle θ of a steering wheel (not shown) of the vehicle V is input from a steering angle sensor 22, and a detection signal indicative of a lateral acceleration GL acting on the vehicle V is input from a lateral acceleration sensor 23. In this case, the steering angle θ is detected as a positive value during forward travel left turning of the vehicle V, and as a negative value during forward travel right turning of the vehicle V.

The lateral acceleration GL is detected as a positive value when it is a leftward acceleration acting on the vehicle V, and as a negative value when it is a rightward acceleration acting on the vehicle V. Further, to the ECU 2, a detection signal indicative of a yaw moment YM of the vehicle V is input from a yaw moment sensor 24, a detection signal indicative of an accelerator pedal opening AP which is a stepped-on amount of an accelerator pedal (not shown) of the vehicle V is input from an accelerator pedal opening sensor 25, and an output signal indicative of the ON/OFF (stepped-on/off state) of a brake pedal (not shown) of the vehicle V is input from a brake switch 26. The yaw moment YM is detected as a positive value when it is a counter-clockwise yaw moment of the vehicle V, and as a negative value when it is a clockwise yaw moment of the vehicle V.

The ECU 2 is implemented by a microcomputer comprised of an I/O interface, a CPU, a RAM, and a ROM 2a, and controls operations of the vehicle V, including operations of the front wheel drive device DFS and the rear wheel drive device DRS, in response to the detection signals from the aforementioned sensors and switches 21 to 26, according to control programs stored in the ROM 2a.

Operation modes of the front wheel drive device DFS include an ENG travel mode in which only the engine 3 is used as a motive power source of the vehicle V, an EV travel mode in which only the front motor 4 is used as a motive power source, an assist travel mode in which the engine 3 is assisted by the front motor 4, a charge travel mode in which the battery 7 is charged by the front motor 4 using part of the engine motive power, a deceleration regeneration mode in which the battery 7 is charged by the front motor 4 using the traveling energy of the vehicle V during decelerating traveling thereof, and so forth. The operations of the front wheel drive device DFS in the respective operation modes are controlled by the ECU 2.

Further, operation modes of the rear wheel drive device DRS include a drive mode, a regeneration mode, a drive and regeneration mode, and so forth. The operations of the rear wheel drive device DRS in the respective operation modes are controlled by the ECU 2. Hereinafter, a description will be sequentially given of these operation modes.

[Drive Mode]

Figure 4:
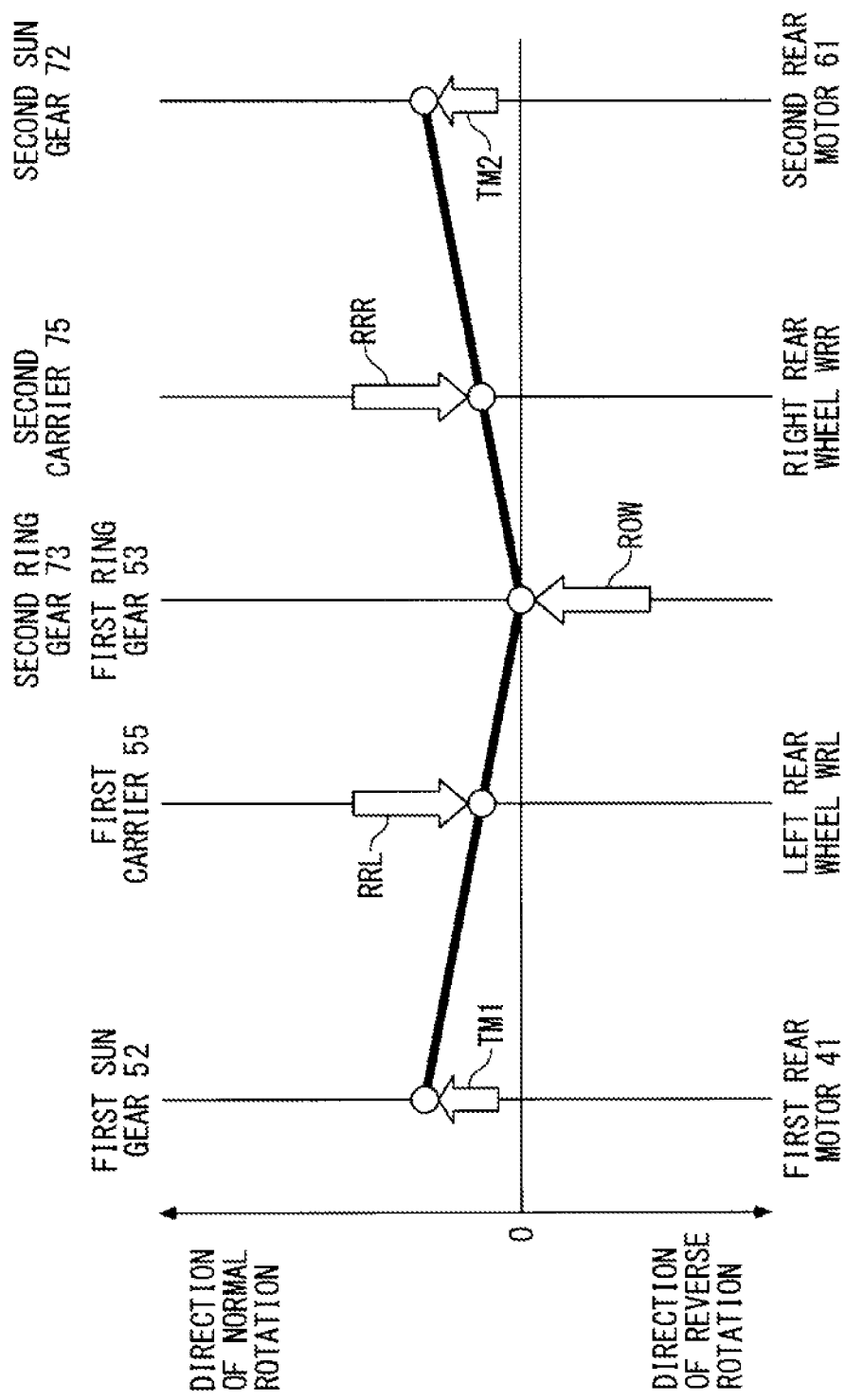
FIG. 4 A collinear chart showing a rotational speed relationship and a torque balance relationship between various types of rotary elements and left and right rear wheels of a rear wheel drive device, as to during a drive mode.

The drive mode is an operation mode in which the left and right rear wheels WRL and WRR are driven by the motive powers of the first and second rear motors 41 and 61. In the drive mode, powering is performed by the first and second rear motors 41 and 61, and electric power supplied to the two 41 and 61 is controlled. Further, in a case where the left and right rear wheels WRL and WRR are caused to perform normal rotation, the rotors 43 and 63 of the first and second rear motors 41 and 61 are caused to perform normal rotation, and the first and second ring gears 53 and 73 are braked by the hydraulic brake 84. FIG. 4 shows a rotational speed relationship and a torque balance relationship between the various types of rotary elements in a case where the left and right rear wheels WRL and WRR are caused to perform normal rotation during the drive mode.

As is apparent from the relationship of connections between the above-described various types of rotary elements, the rotational speed of the first sun gear 52 is equal to the rotational speed of the first rear motor 41 (rotor 43), the rotational speed of the first carrier 55 is equal to the rotational speed of the left rear wheel WRL, and the rotational speed of the first ring gear 53 is equal to the rotational speed of the second ring gear 73. Further, the rotational speed of the second sun gear 72 is equal to the rotational speed of the second rear motor 61 (rotor 63), and the rotational speed of the second carrier 75 is equal to the rotational speed of the right rear wheel WRR. Further, as is widely known, the rotational speeds of the first sun gear 52, the first carrier 55, and the first ring gear 53 are in a collinear relationship in which the rotational speeds are located on the same straight line in a collinear chart, and the first sun gear 52 and the first ring gear 53 are located on opposite outward sides of the first carrier 55. This similarly applies to the second sun gear 72, the second carrier 75, and the second ring gear 73.

From the above, the relationship between the rotational speeds of the various types of rotary elements is expressed as in a collinear chart shown in FIG. 4. Note that in the collinear chart and other collinear charts, referred to hereinafter, the distance from a horizontal line indicating 0 to a white circle shown on a vertical line corresponds to the rotational speed of each of the rotary elements. Further, in FIG. 4, TM1 represents output torque of the first rear motor 41 (hereinafter referred to as the "first rear motor output torque"), and TM2 represents output torque of the second rear motor 61 (hereinafter referred to as the "second rear motor output torque"). Further, RRL represents reaction force torque of the left rear wheel, RRR represents reaction force torque of the right rear wheel, and ROW represents reaction force torque of the one-way clutch 83.

As is apparent from FIG. 4, the first rear motor output torque TM1 acts to cause the first sun gear 52 to perform normal rotation, and acts to cause the first ring gear 53 to perform opposite rotation. With the above, the first rear motor output torque TM1 is transmitted to the left rear wheel WRL via the first carrier 55 and the left rear drive shaft SRL, using the reaction force torque ROW of the one-way clutch 83 acting on the first ring gear 53 as a reaction force, and as a result, the left rear wheel WRL is driven. Similarly, the second rear motor output torque TM2 is transmitted to the right rear wheel WRR via the second carrier 75 and the right rear drive shaft SRR, using the reaction force torque ROW of the one-way clutch 83 acting on the second ring gear 73 as a reaction force. As a result, the right rear wheel WRR is driven. During the drive mode, by changing the first and second rear motor output torques TM1 and TM2, it is possible to freely control torques of the left and right rear wheels WRL and WRR (hereinafter referred to as the "left wheel torque" and the "right wheel torque", respectively).

[Regeneration Mode]

Figure 5:
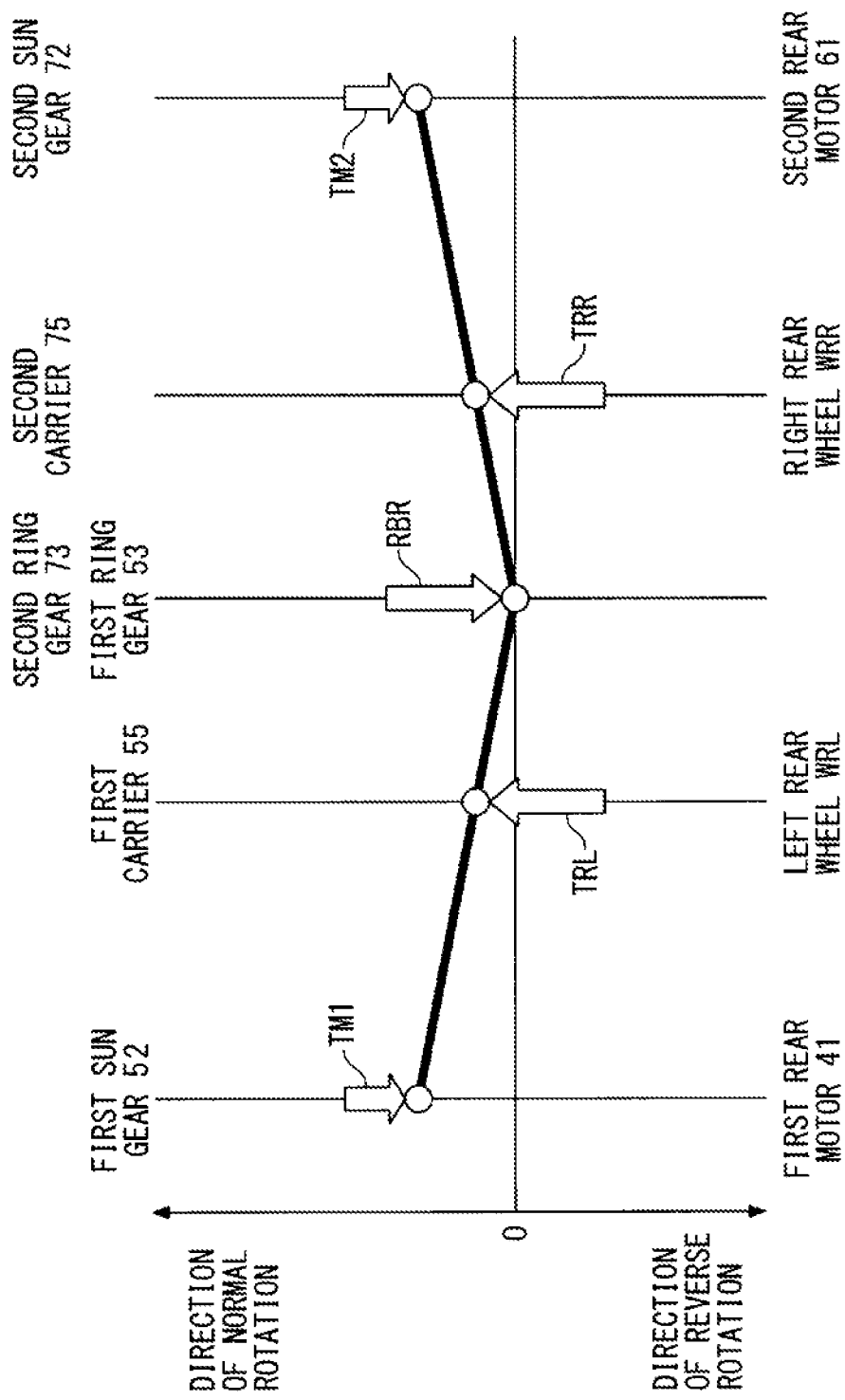
FIG. 5 A collinear chart showing a rotational speed relationship and a torque balance relationship between the various types of rotary elements and the left and right rear wheels of the rear wheel drive device, as to during a regeneration mode.

The regeneration mode is an operation mode in which power generation (regeneration) is performed by the first and second rear motors 41 and 61 using the traveling energy of the vehicle V, and the regenerated electric power is charged into the battery 7. In the regeneration mode, electric power regenerated by the first and second rear motors 41 and 61 is controlled, and the first and second ring gears 53 and 73 are braked by the hydraulic brake 84. FIG. 5 shows a rotational speed relationship and a torque balance relationship between the various types of rotary elements in the regeneration mode. In the figure, TRL represents the left wheel torque (torque of the left rear wheel WRL), and TRR represents the right wheel torque (torque of the right rear wheel WRR). Further, RBR represents reaction force torque of the hydraulic brake 84. The other parameters are as described with reference to FIG. 4. Note that during the regeneration mode, regeneration is performed by the first and second rear motors 41 and 61, and hence the first and second rear motor output torques TM1 and TM2 are negative torques (braking torques).

As is apparent from FIG. 5, the first and second rear motor output torques TM1 and TM2 transmitted to the first and second sun gears 52 and 72, respectively, are transmitted to the first and second carriers 55 and 75, using the reaction force torque RBR of the hydraulic brake 84 as a reaction force, respectively, and are further transmitted to the left and right rear wheels WRL and WRR via the left and right rear drive shafts SRL and SRR. As a consequence, the left and right rear wheels WRL and WRR are braked. During the regeneration mode, similar to the case of the drive mode, by changing the first and second rear motor output torques TM1 and TM2, it is possible to freely control the left wheel torque and the right wheel torque.

[Drive and Regeneration Mode]

Figure 6:
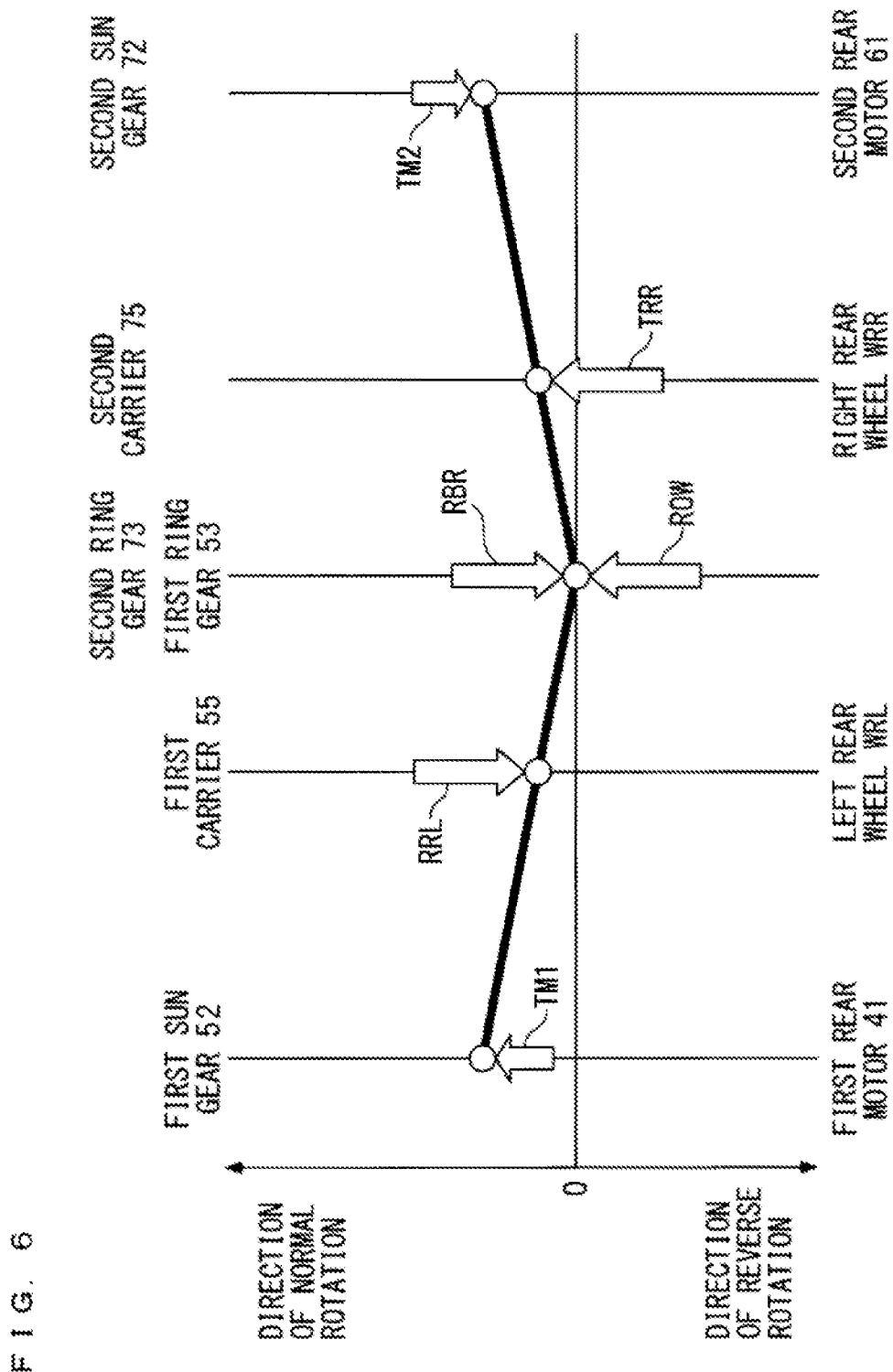
FIG. 6 A collinear chart showing a rotational speed relationship and a torque balance relationship between the various types of rotary elements and the left and right rear wheels of the rear wheel drive device, as to during a drive and regeneration mode.

The drive and regeneration mode is an operation mode in which powering is performed by one of the first and second rear motors 41 and 61, and regeneration is performed by the other of the two motors 41 and 61. During the drive and regeneration mode, electric power supplied to the one motor and electric power regenerated by the other motor are controlled, and the first and second ring gears 53 and 73 are braked by the one-way clutch 83 or the hydraulic brake 84. FIG. 6 shows a rotational speed relationship and a torque balance relationship between the various types of rotary elements in a case where powering is performed by the first rear motor 41, and regeneration is performed by the second rear motor 61. Various parameters in the figure are as described with reference to FIGS. 4 and 5.

As is apparent from FIG. 6 and the above description, the first rear motor output torque TM1 (drive torque) is transmitted to the left rear wheel WRL via the first planetary gear unit 51, whereby the left rear wheel WRL is driven, and the second rear motor output torque TM2 (braking torque) is transmitted to the right rear wheel WRR via the second planetary gear unit 71, whereby the right rear wheel WRR is braked. As a consequence, torques in opposite directions are generated between the left and right rear wheels WRL and WRR, whereby a clockwise yaw moment of the vehicle V is increased.

Inversely to the above, in a case where regeneration is performed by the first rear motor 41, and powering is performed by the second rear motor 61, the left rear wheel WRL is braked, and the right rear wheel WRR is driven. As a consequence, a counterclockwise yaw moment of the vehicle V is increased.

Figure 7:
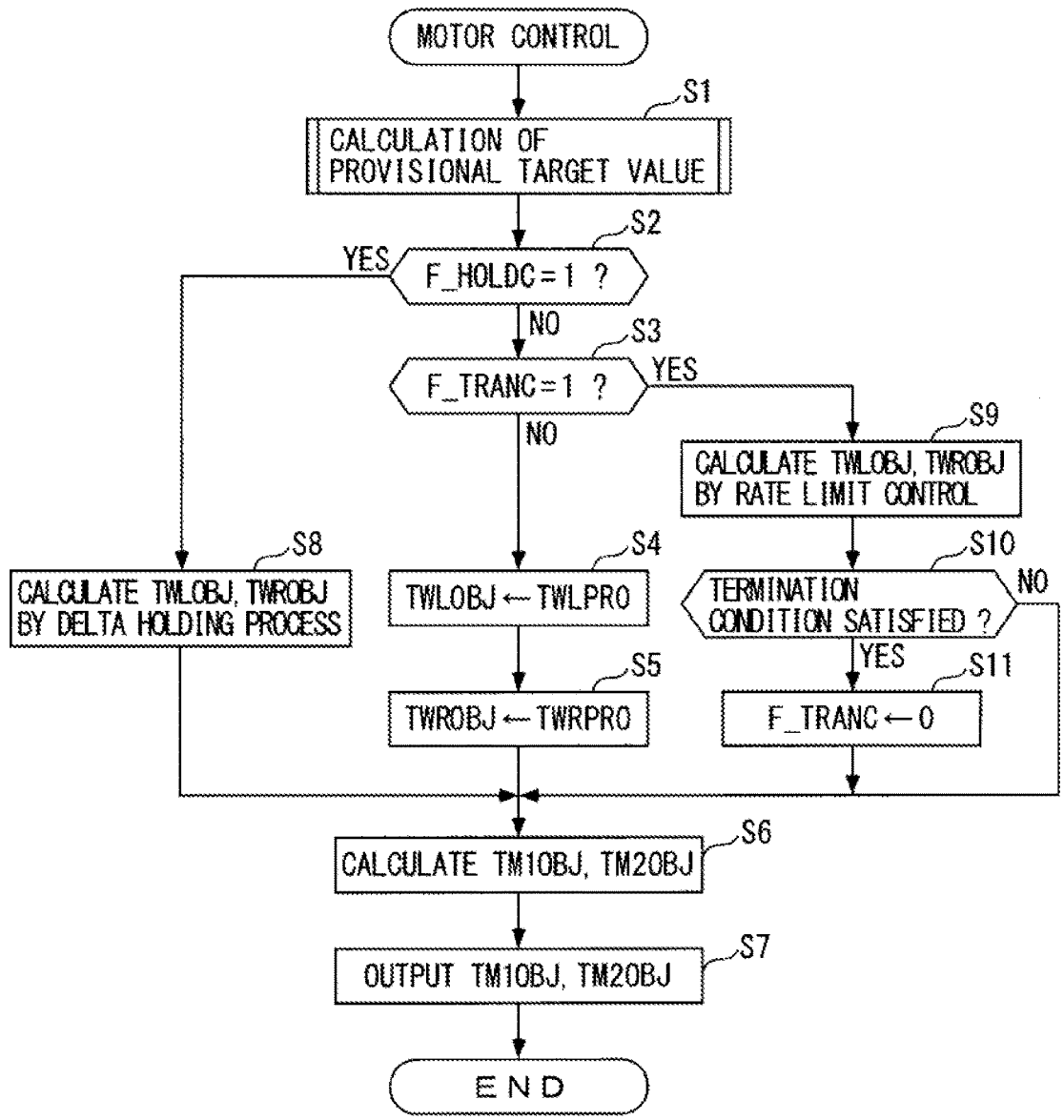
FIG. 7 A flowchart of a motor control process performed by the ECU.
Figure 9:
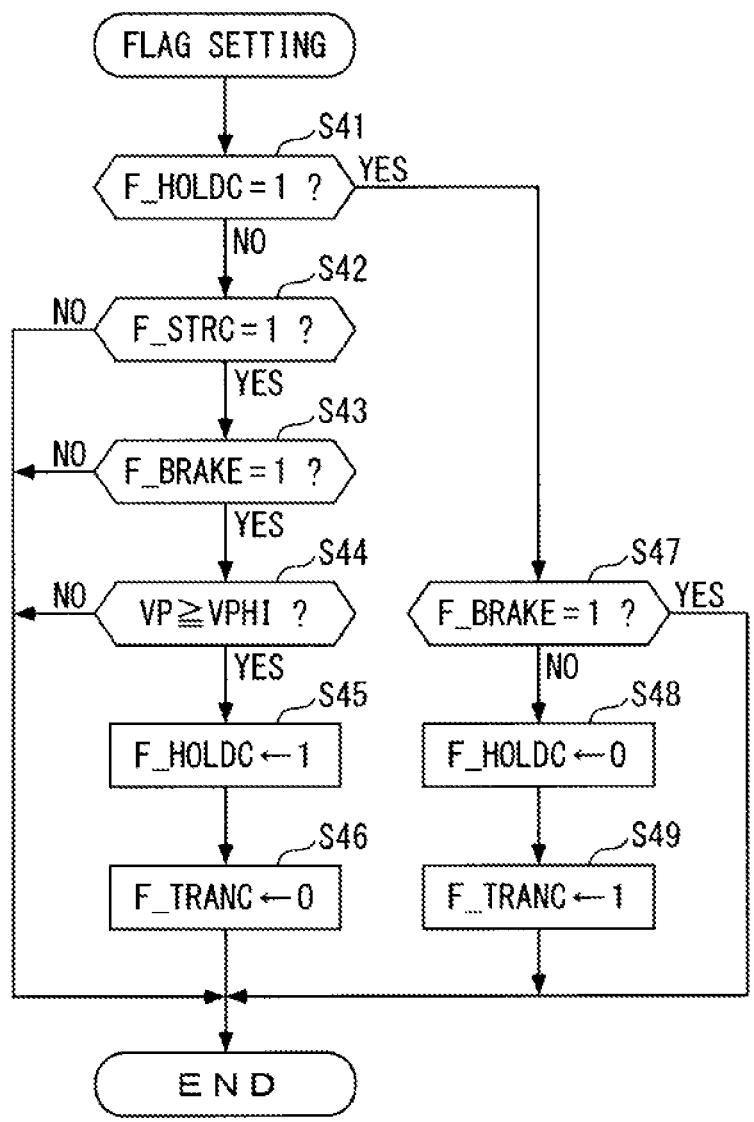
FIG. 9 A flowchart of a flag setting process performed by the ECU.

Further, in order to control the left wheel torque and the right wheel torque, the ECU 2 performs a motor control process shown in FIG. 7 and a flag setting process shown in FIG. 9, for controlling the first and second rear motor output torques TM1 and TM2. These processes are repeatedly performed whenever a predetermined time period (e.g. 100 msec) elapses.

Figure 8:
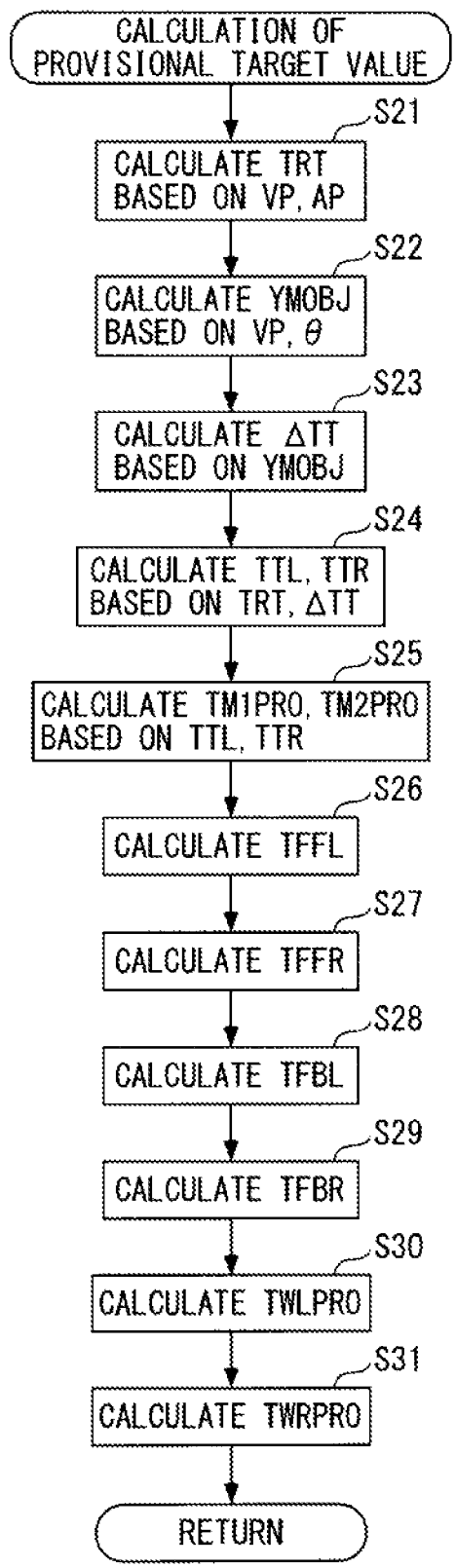
FIG. 8 A flowchart of a provisional target value calculation process performed in a step 1 in FIG. 7.

First, in a step 1 ((shown as "S1"; the same applies hereafter) in FIG. 7, a provisional target value calculation process is performed. FIG. 8 shows the provisional target value calculation process. The present process is for calculating the provisional values of target values of the left wheel torque and the right wheel torque.

First, in a step 21 in FIG. 8, a target torque sum TRT is calculated by searching a predetermined map (not shown) according to the detected vehicle speed VP and accelerator pedal opening AP. The target torque sum TRT is a provisional value of a target value of the sum of the left wheel torque and the right wheel torque, and is set to a larger value as the accelerator pedal opening AP is larger.

Then, a target yaw moment YMOBJ, which is a target value of the yaw moment YM, is calculated by searching a predetermined map (not shown) according to the vehicle speed VP and the detected steering angle θ (step 22). Next, a target torque difference ΔTT is calculated based on the detected target yaw moment YMOBJ (step 23). The target torque difference ΔTT is a provisional value of a target torque of a difference between the left wheel torque and the right wheel torque, and is specifically calculated by the following equation (1):

$$\Delta TT = 2 \cdot r \cdot YMOBJ/Tr \tag{1}$$

wherein r represents the radius of each of the left and right rear wheels WRL and WRR, and Tr represents a tread width (distance between the left and right rear wheels WRL and WRR).

Then, a left wheel provisional target torque TTL and a right wheel provisional target torque TTR are calculated by the same calculation method as a calculation method described in International Publication Pamphlet No. WO2013/005783 (Paragraphs [0113] to [0118]) by the present applicant (step S24). That is, the left wheel provisional target torque TTL and the right wheel provisional target torque TTR are calculated based on the target torque sum TRT and the target torque difference ΔTT calculated in the steps 21 and 23, respectively, by the following equations (2) and (3). The left wheel and right wheel provisional target torques TTL and TTR are provisional target values of the left wheel torque and the right wheel torque, respectively.

$$TTL + TTR = TRT \tag{2}$$

$$TTL - TTR = \Delta TT \tag{3}$$

More specifically, the left wheel provisional target torque TTL is calculated by dividing the sum of the target torque sum TRT and the target torque difference ΔTT by 2 ((TRT+ΔTT)/2). Further, the right wheel provisional target torque TTR is calculated by dividing the difference between the target torque sum TRT and the target torque difference ΔTT by 2 ((TRT−ΔTT)/2).

Next, a first rear motor provisional target torque TM1PRO is calculated by multiplying the calculated left wheel provisional target torque TTL by a predetermined first speed reducing ratio, and a second rear motor provisional target torque TM2PRO is calculated by multiplying the calculated right wheel provisional target torque TTR by a predetermined second speed reducing ratio (step 25). The first and second rear motor provisional target torques TM1PRO and TM2PRO are provisional values of target values of the above-mentioned first and second rear motor output torques TM1 and TM2. Further, the above-mentioned first and second speed reducing ratios are determined by the various types of gears of the first and second planetary gear units 51 and 71, respectively, and are equal to each other.

Next, in steps 26, 27, 28, and 29, a left wheel steering angle proportional torque TFFL, a right wheel steering angle proportional torque TFFR, a left wheel FB torque TFBL, and a right wheel FB torque TFBR are calculated, respectively. These parameters TFFL, TFFR, TFBL, and TFBR are basically calculated by the same calculation method as a calculation method described in Japanese Patent Application No. 2013-159612 (Paragraphs [0046] to [0052], [0060] to [0064] and FIG. 2) by the present applicant.

The calculation of the left wheel and right wheel steering angle proportional torques TFFL and TFFR in the steps 26 and 27 is specifically performed as follows: First, target torques of the engine 3 and the front motor 4 are calculated by searching a predetermined map (not shown) according to the detected vehicle speed VP and accelerator pedal opening AP. Then, a wheel driving force F for the left and right rear wheels WRL and WRR is calculated based on the calculated target torques of the engine 3 and the front motor 4, and the first and second rear motor provisional target torques TM1PRO and TM2PRO calculated in the step 25. Next, an estimated value GLEST of the lateral acceleration GL of the vehicle V is calculated based on the vehicle speed VP and the steering angle θ. Then, the sum of the detected lateral acceleration GL and the calculated estimated value GLEST is calculated as a corrected lateral acceleration GLCOR.

Next, it is determined based on the calculated corrected lateral acceleration GLCOR which of the left and right rear wheels WRL and WRR is an outer wheel, and a front-rear distribution ratio and a left-right distribution ratio are calculated. Then, an outer wheel/inner wheel torque distribution ratio of torque distributed to the left and right rear wheels WRL and WRR is calculated based on the determined outer wheel, and the calculated front-rear distribution ratio and left-right distribution ratio. Then, the left wheel and right wheel steering angle proportional torques TFFL and TFFR are calculated, respectively, by multiplying the calculated wheel driving force F by a ratio based on the outer wheel/inner wheel torque distribution ratio.

Further, the calculations of the left wheel and right wheel FB torques TFBL and TFBR in the steps 28 and 29 are specifically performed as follows: First, a slip angle of the vehicle V is calculated based on the vehicle speed VP, the steering angle θ, the lateral acceleration GL, and the detected yaw moment YM. Then, a slip angle threshold value is calculated based on the vehicle speed VP and the lateral acceleration GL. Next, based on a difference between the calculated slip angle and the slip angle threshold value, when the slip angle is larger than a predetermined value, it is determined that the vehicle V is in an unstable state. To eliminate this state, the left wheel and right wheel FB torques TFBL and TFBR are calculated such that torque distributed to the rear wheels WRL and WRR is reduced and torque distributed to the outer wheel is reduced.

In a step 30 following the step 29, a left wheel provisional target torque TWLPRO is calculated. The left wheel provisional target torque TWLPRO is a provisional value of a target value of the left wheel torque, and is calculated as the sum of the left wheel steering angle proportional torque TFFL calculated in the step 26 and the left wheel FB torque TFBL calculated in the step 28. Then, a right wheel provisional target torque TWRPRO is calculated (step 31), followed by terminating the present process. The right wheel provisional target torque TWRPRO is a provisional value of a target value of the right wheel torque, and is calculated as the sum of the right wheel steering angle proportional torque TFFR calculated in the step 27 and the right wheel FB torque TFBR calculated in the step 29.

Referring again to FIG. 7, in a step 2 following the step 1, it is determined whether or not a holding control flag F_HOLDC is equal to 1. The holding control flag F_HOLDC indicates that holding control, referred to hereinafter, is being performed, by 1, and is set in the flag setting process shown in FIG. 9. Detailed description thereof will be given hereinafter. If the answer to the question of the step 2 is negative (NO) (F_HOLDC=0), i.e. if the holding control is not being performed, it is determined whether or not a shifting control flag F_TRANC is equal to 1 (step 3). The shifting control flag F_TRANC indicates that shifting control, referred to hereinafter, is being performed, by 1, and is set in the above-mentioned flag setting process. Detailed description thereof will be given hereinafter.

If the answer to the question of the step 3 is negative (NO) (F_TRANC=0), i.e. if the shifting control is not being performed, in steps 4 and 5, the left wheel provisional target torque TWLPRO and the right wheel provisional target torque TWRPRO calculated in the steps 30 and 31 in FIG. 8, respectively, are set as a left wheel target torque TWLOBJ and a right wheel target torque TWROBJ, respectively. The left wheel and right wheel target torques TWLOBJ and TWROBJ are target values of the left wheel torque and the right wheel torque, respectively.

In a step 6 following the step 5, a first rear motor target torque TM1OBJ is calculated by multiplying the calculated (set) left wheel target torque TWLOBJ by the above-mentioned first speed reducing ratio, and a second rear motor target torque TM2OBJ is calculated by multiplying the calculated (set) right wheel target torque TWROBJ by the above-mentioned second speed reducing ratio. The first and second rear motor target torques TM1OBJ and TM2OBJ are target values of the above-described first and second rear motor output torques TM1 and TM2, respectively.

In a step 7 following the step 6, control signals based on the calculated first and second rear motor target torques TM1OBJ and TM2OBJ are delivered to the PDU 6, followed by terminating the present process. This causes the first and second rear motor output torques TM1 and TM2 to be controlled via the PDU 6 such that the first and second rear motor output torques TM1 and TM2 become equal to the first and second rear motor target torques TM1OBJ and TM2OBJ, respectively. As a consequence, the left wheel torque and the right wheel torque are controlled such that they become equal to the left wheel and right wheel target torques TWLOBJ and TWROBJ, respectively.

Hereinafter, the control of the left wheel torque and the right wheel torque performed in the steps 1 and 4 to 7 is referred to as the "normal control". When the normal control is performed during turning of the vehicle V, the left wheel torque and the right wheel torque are controlled such that a torque difference is generated between the left and right rear wheels WRL and WRR, whereby a yaw moment in the same direction as the turning direction of the vehicle V or in a direction opposite to the turning direction of the vehicle V acts on the vehicle V. Hereinafter, control for generating a torque difference between the left and right rear wheels WRL and WRR during turning of the vehicle V such that the yaw moment in the direction opposite to the turning direction of the vehicle V acts on the vehicle V is referred to as the "opposite distribution control".

On the other hand, if the answer to the question of the step 2 is affirmative (YES) (F_HOLDC=1), the above-described holding control is performed. The holding control is for holding the difference between the left wheel torque and the right wheel torque (hereinafter referred to as the "left-right torque difference") at the same value as immediately before the start of the holding control. Specifically, in a step 8, the left wheel target torque TWLOBJ and the right wheel target torque TWROBJ are calculated by performing a delta holding process. Then, the step 6 et seq. are performed, whereby the first and second rear motor target torques TM1OBJ and TM2OBJ are calculated based on the calculated left wheel and right wheel target torques TWLOBJ and TWROBJ, respectively, and control signals based on the former TM1OBJ and the latter TM2OBJ are delivered to the PDU 6, followed by terminating the present process.

In the above-mentioned delta holding process, the left wheel and right wheel target torques TWLOBJ and TWROBJ are specifically calculated as follows: First, a difference between an immediately preceding value TWLOBJZ of the left wheel target torque and an immediately preceding value TWROBJZ of the right wheel target torque is calculated as an immediately preceding value of a left-right target torque difference, and a difference between the left wheel provisional target torque TWLPRO and the right wheel provisional target torque TWRPRO is calculated as a left-right provisional target torque difference. Then, when the calculated immediately preceding value of the left-right target torque difference and the calculated left-right provisional target torque difference are equal to each other, the left wheel provisional target torque TWLPRO and the right wheel provisional target torque TWRPRO are set as the left wheel target torque TWLOBJ and the right wheel target torque TWROBJ, respectively.

On the other hand, when the immediately preceding value of the left-right target torque difference and the left-right provisional target torque difference are different from each other, the sum of the immediately preceding value TWLOBJZ of the left wheel target torque and the immediately preceding value TWROBJZ of the right wheel target torque is calculated as an immediately preceding value of a left-right target torque sum, and the sum of the left wheel provisional target torque TWLPRO and the right wheel provisional target torque TWRPRO is calculated as a left-right provisional target torque sum. Then, the absolute value of a difference between the calculated left-right provisional target torque sum and the immediately preceding value of the left-right target torque sum is calculated as a left-right sum provisional change amount. Next, a value obtained by subtracting a half of the left-right sum provisional change amount from the immediately preceding value TWLOBJZ of the left wheel target torque (TWLOBJZ−left-right sum provisional change amount/2) is calculated as the left wheel target torque TWLOBJ. Further, a value obtained by subtracting the half of the left-right sum provisional change amount from the immediately preceding value TWROBJZ of the right wheel target torque (TWROBJZ−left-right sum provisional change amount/2) is calculated as the right wheel target torque TWROBJ.

With the above, during performance of the holding control, the left wheel target torque TWLOBJ and the right wheel target torque TWROBJ are calculated so as to hold the left-right target torque difference, which is a difference between the former TWLOBJ and the latter TWROBJ, at a value immediately before the start of the holding control. As a consequence, the left wheel torque and the right wheel torque are controlled such that the left-right torque difference (the difference between the left wheel torque and the right wheel torque) is held at the same value as immediately before the start of the holding control. On the other hand, as to the sum of the left wheel torque and the right wheel torque (hereinafter referred to as the "left-right torque sum"), the left wheel torque and the right wheel torque are controlled such that the left-right torque sum is changed to a value based on the left wheel and right wheel provisional target torques TWLPRO and TWRPRO, i.e. a value corresponding to a traveling state of the vehicle V.

On the other hand, if the answer to the question of the step 3 is affirmative (YES) (F_TRANC=1), the shifting control is performed. The shifting control is for preventing the left wheel torque and the right wheel torque from being suddenly changed when the above-described holding control is shifted to the normal control. Specifically, first, in a step 9, the left wheel and right wheel target torques TWLOBJ and TWROBJ are respectively calculated by performing a rate-limiting process on the left wheel and right wheel provisional target torques TWLPRO and TWRPRO calculated in the steps 30 and 31 in FIG. 8, respectively.

Specifically, the left wheel target torque TWLOBJ is calculated as follows: When the immediately preceding value TWLOBJZ of the left wheel target torque is larger than the left wheel provisional target torque TWLPRO, and also the absolute value of a difference between the former TWLOBJZ and the latter TWLPRO is larger than a predetermined value (positive value) (when the degree of separation therebetween is large), a value obtained by subtracting a predetermined subtraction term (positive value) from the immediately preceding value TWLOBJZ is calculated as the left wheel target torque TWLOBJ. On the other hand, when the immediately preceding value TWLOBJZ of the left wheel target torque is smaller than the left wheel provisional target torque TWLPRO, and also the absolute value of the difference between the former TWLOBJZ and the latter TWLPRO is larger than the above-mentioned predetermined value, a value obtained by adding a predetermined addition term (positive value) to the immediately preceding value TWLOBJZ is calculated as the left wheel target torque TWLOBJ. On the other hand, when the absolute value of the difference between the immediately preceding value TWLOBJZ of the left wheel target torque and the left wheel provisional target torque TWLPRO is not larger than the predetermined value, the left wheel provisional target torque TWLPRO is set as the left wheel target torque TWLOBJ.

Similarly, the right wheel target torque TWROBJ is calculated as follows: When the immediately preceding value TWROBJZ of the right wheel target torque is larger than the right wheel provisional target torque TWRPRO, and also the absolute value of a difference between the former TWROBJZ and the latter TWRPRO is larger than the above-mentioned predetermined value (when the degree of separation therebetween is large), a value obtained by subtracting the above-mentioned subtraction term from the immediately preceding value TWROBJZ is calculated as the right wheel target torque TWROBJ. On the other hand, when the immediately preceding value TWROBJZ of the right wheel target torque is smaller than the right wheel provisional target torque TWRPRO, and also the absolute value of the difference between the former TWROBJZ and the latter TWRPRO is larger than the predetermined value, a value obtained by adding the above-mentioned addition term to the immediately preceding value TWROBJZ is calculated as the right wheel target torque TWROBJ. On the other hand, when the absolute value of the difference between the immediately preceding value TWROBJZ of the right wheel target torque and the right wheel provisional target torque TWRPRO is not larger than the predetermined value, the right wheel provisional target torque TWRPRO is set as the right wheel target torque TWROBJ.

In a step 10 following the step 9, it is determined whether or not predetermined termination conditions are satisfied. The termination conditions are conditions that the absolute value of the difference between the immediately preceding value TWLOBJZ of the left wheel target torque and the left wheel provisional target torque TWLPRO is not larger than the predetermined value, and also the absolute value of the difference between the immediately preceding value TWROBJZ of the right wheel target torque and the right wheel provisional target torque TWRPRO is not larger than the predetermined value. If the answer to the question of the above step 10 is negative (NO), i.e. if the predetermined termination conditions are not satisfied, the step 6 et seq. are performed, whereby the first and second rear motor target torques TM1OBJ and TM2OBJ are calculated based on the calculated (set) left wheel and right wheel target torques TWLOBJ and TWROBJ, respectively, and control signals based on the two TM1OBJ and TM2OBJ are delivered to the PDU 6, followed by terminating the present process.

On the other hand, if the answer to the question of the above-described step 10 is affirmative (YES), i.e. if the predetermined termination conditions are satisfied, it is judged that the immediately preceding value TWLOBJZ of the left wheel target torque and the immediately preceding value TWROBJZ of the right wheel target torque have become close to the left wheel provisional target torque TWLPRO and the right wheel provisional target torque TWRPRO, respectively, and to terminate the shifting control, the shifting control flag F_TRANC is reset to 0 (step 11). Then, the step 6 et seq. are performed, followed by terminating the present process.

From the above, during performance of the shifting control, the left wheel torque and the right wheel torque are controlled such that they are progressively returned from values to which they have been controlled at the end of the holding control (the immediately preceding values TWLOBJZ and TWROBJZ) to values to which they are controlled by the normal control (the left wheel provisional target torque TWLPRO and the right wheel provisional target torque TWRPRO).

Next, the above-mentioned flag setting process will be described with reference to FIG. 9. First, in a step 41 in FIG. 9, it is determined whether or not the holding control flag F_HOLDC is equal to 1. If the answer to this question is negative (NO) (F_HOLDC=0), i.e. if the holding control is not being performed, it is determined whether or not an opposite distribution control in-process flag F_STRC is equal to 1. (step 42). The opposite distribution control in-process flag F_STRC indicates that the above-described opposite distribution control (control of the left and right wheel torques, for generating a yaw moment during turning of the vehicle V in a direction opposite to the turning direction of the vehicle V) is being performed, by 1, and is set based on the steering angle θ, the first and second rear motor target torques TM1OBJ and TM2OBJ, and the like.

If the answer to the question of the step 42 is negative (NO), the present process is immediately terminated, whereas if the answer to the question of the step 42 is affirmative (YES) (F_STRC=1), i.e. if the opposite distribution control is being performed, it is determined whether or not a brake flag F_BRAKE is equal to 1 (step 43). The brake flag F_BRAKE is set to 1 when the output signal from the brake switch 26 indicates an ON state, i.e. when the brake pedal is being stepped on by a driver. If the answer to the question of the step 43 is negative (NO), the present process is immediately terminated.

If the answer to the question of the step 43 is affirmative (YES) (F_BRAKE=1), i.e. if the brake pedal is being stepped on, it is determined whether or not the vehicle speed VP is not lower than a predetermined high vehicle speed VPHI (step 44). If the answer to this question is negative (NO), the present process is immediately terminated.

On the other hand, if the answer to the question of the step 44 is affirmative (YES), i.e. in a case where the holding control is not being performed, and also the vehicle V is in a high-speed traveling state during performance of the opposite distribution control, when the brake pedal is stepped on, the above-described holding control flag F_HOLDC is set to 1 in order to start the holding control described above (step 45). Then, the shifting control flag F_TRANC is set to 0 (step 46), followed by terminating the present process. Note that the holding control flag F_HOLDC is reset to 0 at the start of the engine 3.

On the other hand, if the answer to the question of the step 41 is affirmative (YES) (F_HOLDC=1), i.e. if the holding control is being performed, it is determined whether or not the brake flag F_BRAKE is equal to 1 (step 47). If the answer to this question is affirmative (YES), the present process is immediately terminated, whereas if the answer to the question of the step 47 is negative (NO) (F_BRAKE=0), i.e. if the stepped-on state of the brake pedal is released during performance of the holding control, the holding control flag F_HOLDC is reset to 0 in order to terminate the holding control in process (step 48). Then, to start the shifting control, the shifting control flag F_TRANC is set to 1 (step 49), followed by terminating the present process. Note that the shifting control flag F_TRANC is reset to 0 at the start of the engine 3 and at the stop of the vehicle V.

Figure 10:
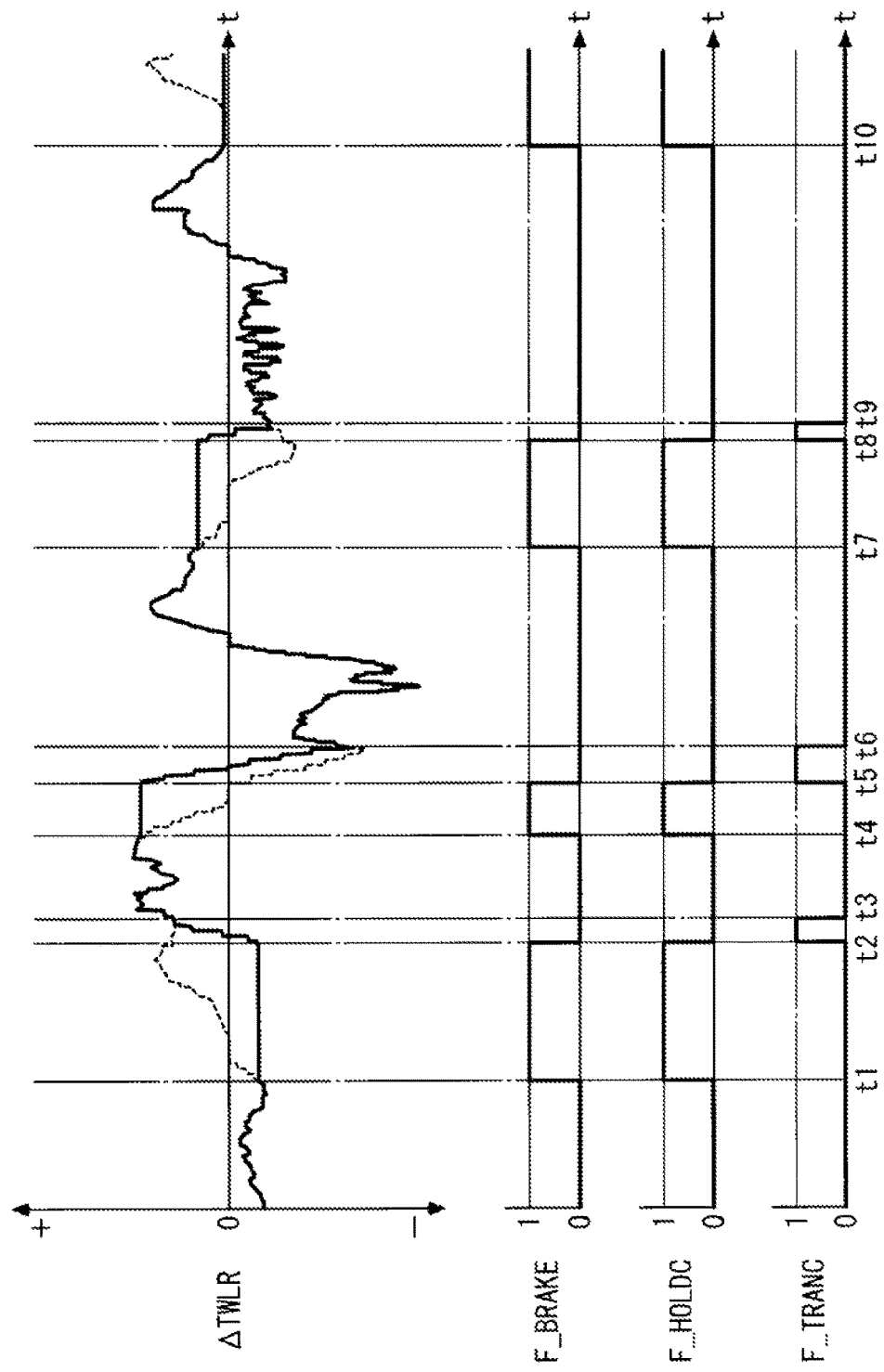
FIG. 10 A timing diagram showing an example of operation of the motor control process and the flag setting process together with a comparative example.

FIG. 10 shows an example (solid line) of operations of the motor control process (FIG. 7) and the flag setting process (FIG. 9) together with a comparative example (broken line). In the figure, ΔTWLR represents the above-mentioned left-right torque difference (the difference between the left wheel torque and the right wheel torque). Further, the comparative example shows a case where only the normal control in the steps 1 and 4 to 7 is performed without performing either of the holding control in the step 8 and the like in FIG. 7 and the shifting control in the step 9 and the like in FIG. 7. That is, the comparative example corresponds to the left-right torque difference ΔTWLR controlled based on the left wheel target torque TWLOBJ set to the left wheel provisional target torque TWLPRO, and the right wheel target torque TWROBJ set to the right wheel provisional target torque TWRPRO.

As described with reference to FIG. 9, in the case where the vehicle speed VP is not lower than the predetermined high vehicle speed VPHI during performance of the opposite distribution control (F_STRC=1), when the brake pedal is stepped on (F_BRAKE=1, YES to the steps 42 to 44 in FIG. 9), the holding control flag F_HOLDC is set to 1, and thereafter is held at 1 unless the stepped-on state of the brake pedal is released. Further, when the holding control flag F_HOLDC is set to 1, the holding control is performed (YES to the step 2 in FIG. 7). During performance of the holding control, when the stepped-on state of the brake pedal is released (NO to the step 47), the holding control flag F_HOLDC is reset to 0 (step 48), and the holding control is terminated.

Further, during performance of the holding control, the left wheel and right wheel target torques TWLOBJ and TWROBJ are calculated such that the left-right target torque difference (the difference between TWLOBJ and TWROBJ) is held at the same value as immediately before the start of the holding control (step 8). With this, according to the present embodiment, from a time point t1 to immediately before a time point t2 appearing in FIG. 10, from a time point t4 to immediately before a time point t5, from a time point t7 to immediately before a time point t8, and after a time point t10, as indicated by solid lines, during performance of the holding control (F_HOLDC=1), the left-right torque difference ΔTWLR is held at the same value as immediately before the start of the holding control, and remains constant.

On the other hand, a left-right torque difference Δ TWLR according to the comparative example, indicated by a broken line, is changed with the lapse of time. Particularly, from the time point t1 to immediately before the time point t2, and from the time point t7 to immediately before the time point t8, appearing in FIG. 10, when the brake pedal is stepped on (F_BRAKE=1), the left-right torque difference ΔTWLR is drastically changed between a positive value and a negative value.

Further, the shifting control flag F_TRANC is set to 1 after the holding control is terminated by release of the stepped-on state of the brake pedal (the step 49 in FIG. 9), whereby the shifting control is started (YES to the step 3, and the step 9 in FIG. 7). During performance of the shifting control, when the degree of separation of the immediately preceding value TWLOBJZ of the left wheel target torque (the immediately preceding value TWROBJZ of the right wheel target torque) from the left wheel provisional target torque TWLPRO (the right wheel provisional target torque TWRPRO) is large, the left wheel target torque TWLOBJ (the right wheel target torque TWROBJ) is calculated such that it is progressively returned from the immediately preceding value TWLOBJZ (TWROBJZ) to the left wheel provisional target torque TWLPRO (the right wheel provisional target torque TWRPRO).

With this, according to the present embodiment, from the time point t2 to immediately before the time point t3, from the time point t5 to immediately before the time point t6, and from the time point t8 to immediately before the time point t9, appearing in FIG. 10, as indicated by solid lines, during performance of the shifting control (F_TRANC=1), the left-right torque difference ΔTWLR is progressively changed toward values controlled based on the left wheel and right wheel provisional target torques TWLPRO and TWRPRO, indicated by broken lines. The shifting control flag F_TRANC is reset to 0 (step 11) when the above-described termination conditions (both of the absolute value of the difference between TWLOBJZ and TWLPRO and the absolute value of the difference between TWROBJZ and TWRPRO are not larger than the predetermined value) are satisfied (YES to the step 10 in FIG. 7), whereby the shifting control is terminated.

Further, when the holding control flag F_HOLDC and the shifting control flag F_TRANC are both equal to 0 (from immediately after the time point t3 to immediately before the time point t4, from immediately after the time point t6 to immediately before the time point t7, and from immediately after the time point t9 to immediately before the time point t10), the normal control (the steps 1 and 4 to 7 in FIG. 7) is performed, whereby the left wheel and right wheel target torques TWLOBJ and TWROBJ are calculated according to traveling conditions of the vehicle V, such as the vehicle speed VP and the lateral acceleration GL. With this, the left-right torque difference ΔTWLR is changed with the lapse of time, as indicated by solid lines in FIG. 10.

Figure 11:
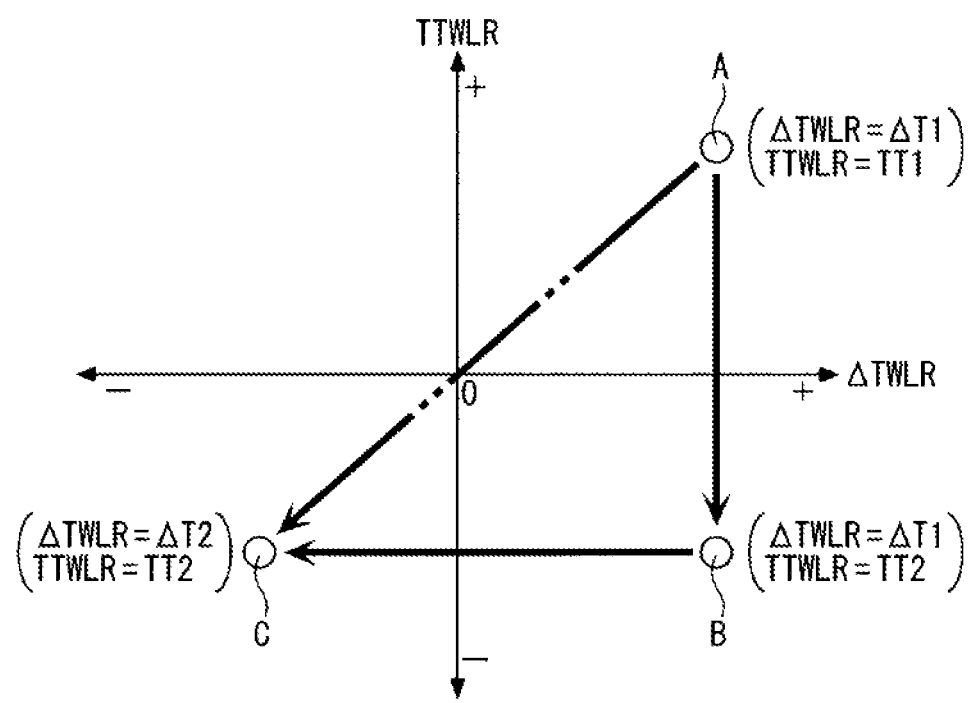
FIG. 11 A diagram showing an example of changes in a left-right torque difference and a left-right torque sum during time after the start of the holding process until the start of the normal control, together with a comparative example.

Further, FIG. 11 shows an example (arrowed thick solid line) of changes in the left-right torque difference ΔTWLR and a left-right torque sum TTWLR (the sum of the left wheel torque and the right wheel torque) during time from the start of the holding control to the start of the normal control, together with a comparative example (arrowed two-dot chain line). Similar to the comparative example shown in FIG. 10, the comparative example shows the case where only the normal control is performed without performing either of the holding control and the shifting control.

As indicated by a white circle A in FIG. 11, at the start of the holding control, the left-right torque difference ΔTWLR and the left-right torque sum TTWLR are controlled to a first torque difference ΔT1 and a first torque sum TT1, both of which are positive values, respectively. Further, during performance of the holding control, as indicated by the arrowed thick solid line in FIG. 11, the left-right torque sum TTWLR is reduced in a state where the left-right torque difference ΔTWLR is constant. At the end of the holding control, the left-right torque difference ΔTWLR is controlled to the first torque difference ΔT1, similarly to when the holding control is started, and the left-right torque sum TTWLR is controlled to a second torque sum TT2 smaller than the first torque sum TT. Then, from the termination of the holding control, through the following shifting control, to the start of the normal control, the left-right torque difference ΔTWLR is reduced so that at the start of the normal control, it becomes a second torque difference ΔT2, which is a negative value, as indicated by a white circle C in FIG. 11.

On the other hand, in the comparative example, as indicated by the arrowed two-dot chain line in FIG. 11, the left-right torque difference ΔTWLR and the left-right torque sum TTWLR are reduced from the first torque difference ΔT1 and the first torque sum TT1 (the white circle A) toward the second torque difference ΔT2 and the second torque sum TT2 (the white circle C), respectively. In this case, a rate of change in the left-right torque difference ΔTWLR (amount of change per unit time) is higher than a rate of change in the left-right torque sum TTWLR (amount of change per unit time) (|ΔT2−ΔT1|>|TT2−TT1|).

Figure 12:
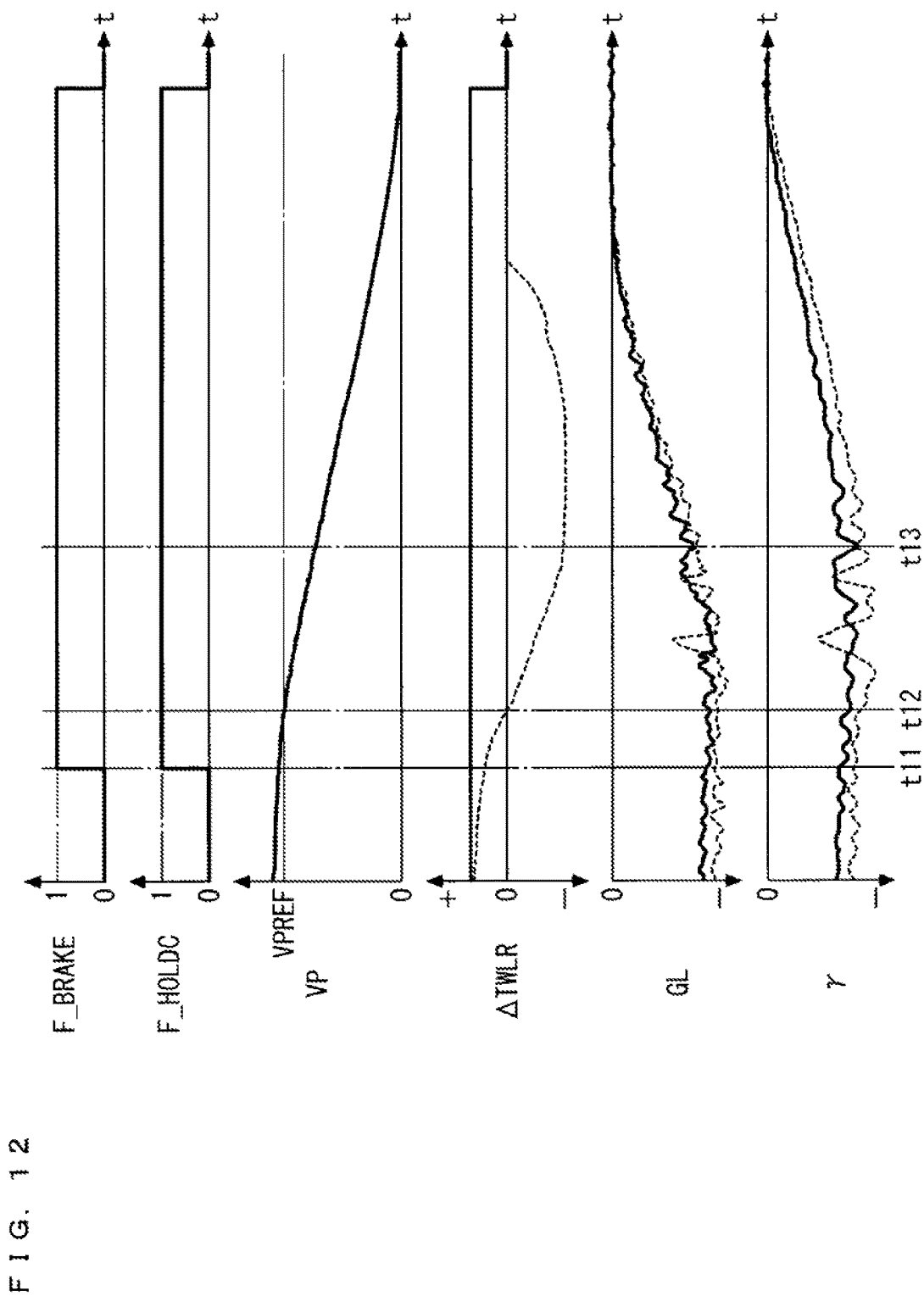
FIG. 12 A timing diagram showing an example of operations by the present embodiment, together with a comparative example.

Further, FIG. 12 shows an example (solid line) of operation by the present embodiment in a case where the brake pedal is stepped on when the opposite distribution control is being performed during high-speed traveling of the vehicle V, together with a comparative example (broken line). The comparative example shows a case where the left wheel torque and the right wheel torque are controlled as in the above-described conventional control system such that the absolute value of the yaw moment YM is reduced when, the vehicle speed VP is not lower than a predetermined vehicle speed VPREF, whereas when the vehicle speed VP is lower than the predetermined vehicle speed VPREF, the absolute value of the yaw moment YM is increased.

As shown in FIG. 12, according to the present embodiment (solid line), as described hereinabove, the holding control is started (F_HOLDC=1, a time point T11) by the brake pedal being stepped on (F_BRAKE=1). During performance of the holding control, the left-right torque difference ΔTWLR is held at the same value as immediately before the start of the holding control, and remains constant. With this control, according to the present embodiment, the absolute values of the lateral acceleration GL and the yaw moment YM are stably reduced without being largely changed by reduction of the vehicle speed VP due to the brake pedal being stepped on.

On the other hand, in the comparative example (broken line), the left-right torque difference ΔTWLR is set to a positive value when the vehicle speed VP is not lower than the predetermined vehicle speed VPREF (before time point T12), whereas when the vehicle speed VP is made lower than the predetermined vehicle speed VPREF by the brake pedal being stepped on (time point T12), the left-right torque difference ΔTWLR is controlled to a negative value after that. As described above, it is understood that the left-right torque difference ΔTWLR is drastically changed from the positive value to the negative value, whereby the lateral acceleration GL and the yaw moment YM are repeatedly largely increased and decreased to undergo large fluctuation, from the time point T12 at which the left-right torque difference ΔTWLR is reduced to the negative value, to a time point T13 after the time point t12. Note that the absolute values of the lateral acceleration GL and the yaw moment YM are repeatedly temporarily and largely decreased between the time point t12 and the time point t13 because the brake is controlled by so-called VSA (Vehicle Stability Assist) according to the large fluctuation in the above-described lateral acceleration GL and the like.

Further, the correspondence between various elements of the present embodiment and various elements of the present invention is as follows: The vehicle V of the present embodiment corresponds to a vehicle of the present invention, the left rear wheel WRL of the present embodiment corresponds to a left driving part and a left wheel of the present invention, and the right rear wheel WRL of the present embodiment corresponds to a right driving part and a right wheel of the present invention. Further, the rear wheel drive device DRS of the present embodiment corresponds to a drive device of the present invention, and the first and second rear motors 41 and 61 correspond to a left rotating electric machine and a right rotating electric machine of the present invention.

Further, the ECU 2 of the present embodiment corresponds to a controller, a target value calculater, and a computer of the present invention, the brake switch 26 and the ECU 2 of the present embodiment correspond to deceleration obtainer of the present invention, and the vehicle speed sensor 21 of the present embodiment corresponds to a speed obtainer of the present invention. Furthermore, the vehicle speed sensor 21, the steering angle sensor 22, the lateral acceleration sensor 23, and the yaw moment sensor 24 of the present embodiment correspond to a movement state obtainer and a control parameter obtainer of the present invention, the accelerator pedal opening sensor 25 of the present embodiment corresponds to the control parameter obtainer of the present invention, and the ROM 2a of the present embodiment corresponds to a recording medium of the present invention.

As described heretofore, according to the present embodiment, the opposite distribution control for generating the left-right torque difference ΔTWLR is performed by controlling the left wheel torque and the right wheel torque such that a yaw moment in a direction opposite to the turning direction of the vehicle V acts on the vehicle V. With this, by reducing a yaw moment during turning of the vehicle V, it is possible to stabilize the behavior of the vehicle V. Further, the holding control is performed during performance of the opposite distribution control and also during deceleration of the vehicle V, whereby the left-right torque difference ΔTWLR is held at the same value as immediately before the start of the holding control. Therefore, it is possible to positively suppress a change in the yaw moment of the vehicle V when the vehicle V is being decelerated during turning thereof, which in turn makes it possible to positively stabilize the behavior of the vehicle V. Further, when the left-right torque difference ΔTWLR is being generated such that a yaw moment in the same direction as the turning direction of the vehicle V acts on the vehicle V, i.e. when the turning of the vehicle V is assisted, the holding control is not performed, so that excessive turning of the vehicle V is prevented from being caused by unnecessarily maintaining the turning assistance. Further, in this case, by controlling only the left wheel torque and the right wheel torque, it is possible to stabilize the behavior of the vehicle V without determining whether or not the behavior of the vehicle V is stable.

Further, during performance of the opposite distribution control, in the case where the vehicle speed VP is not lower than the high vehicle speed VPHI, the holding control is started when the vehicle V is decelerated. Therefore, it is possible to effectively obtain the above-described advantageous effect, that is, the advantageous effect that the behavior of the vehicle V can be stabilized when the vehicle is being decelerated during turning thereof. Furthermore, when the vehicle speed VP is lower than the high vehicle speed VPHI, it is possible to freely control the left-right torque difference ΔTWLR without starting the holding control, so that it is possible to cause the yaw moment in the same direction as the turning direction of the vehicle V to act on the vehicle V.

Furthermore, during performance of the holding control, until the stepped-on state of the brake pedal is released and the deceleration of the vehicle V is terminated, the holding control is continued. The holding control is thus continued during time from the start of deceleration of the vehicle V during turning thereof to the end thereof, and therefore it is possible to stabilize the behavior of the vehicle V.

Further, after termination of the holding control, the left wheel torque and the right wheel torque are controlled such that they are progressively, not suddenly, returned from values to which they have been controlled at the end of the holding control (the immediately preceding values TWLOBJZ and TWROBJZ) to values to which they are controlled by the normal control (the left wheel provisional target torque TWLPRO and the right wheel provisional target torque TWRPRO). This makes it possible to smoothly shift the holding control to the normal control without drastically changing the left-right torque difference ΔTWLR.

Furthermore, by controlling the first and second rear motors 41 and 61, it is possible to control the left wheel torque and the right wheel torque independently of each other, and hence it is possible to properly obtain the above-described advantageous effect, that is, the advantageous effect that the behavior of the vehicle V can be stabilized when the vehicle V is being decelerated during turning thereof.

Figure 13:
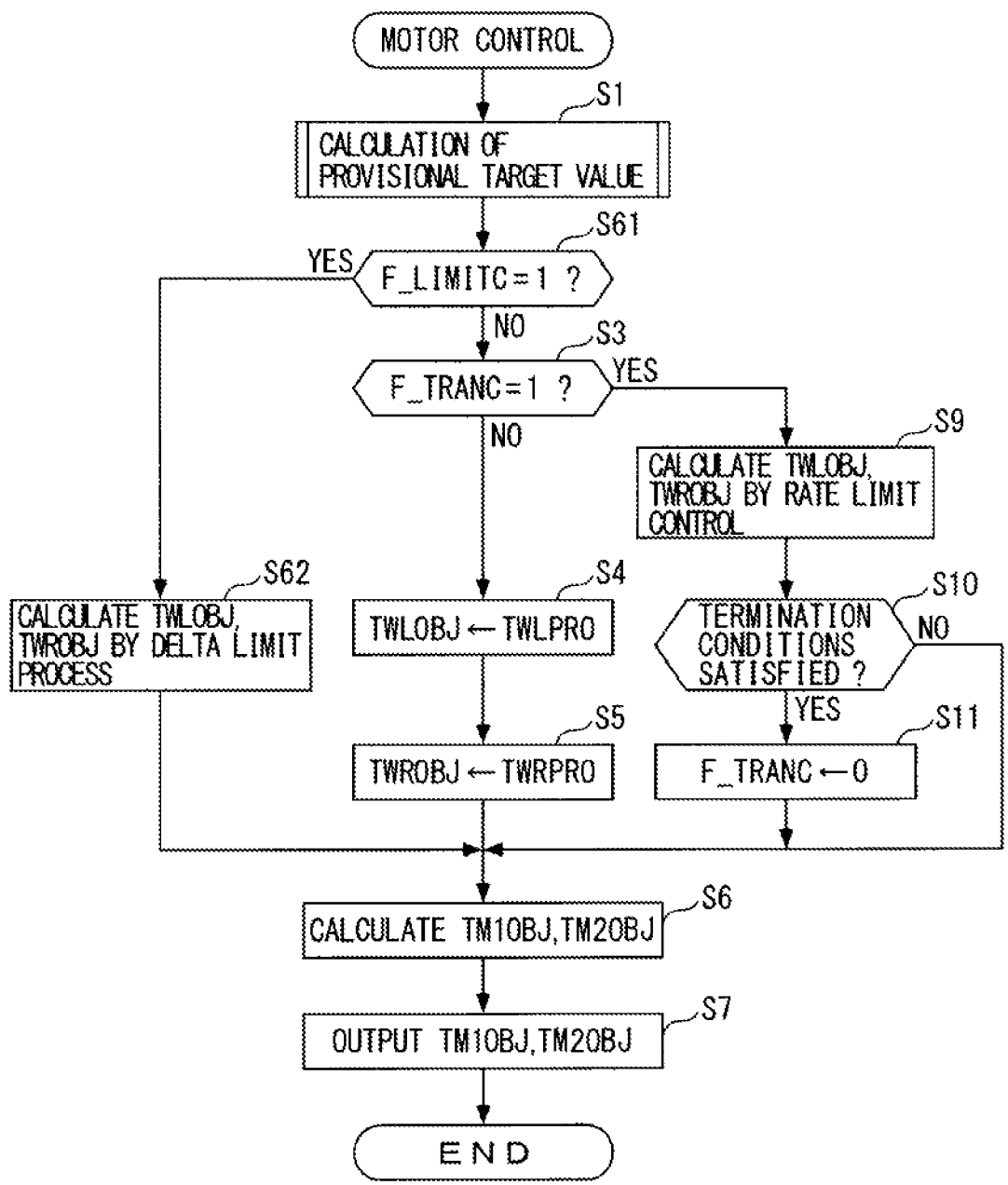
FIG. 13 A flowchart of a variation of the motor control process.

Next, a variation of the motor control process will be described with reference to FIG. 13. In the figure, the same steps as those in the motor control process shown in FIG. 7 are denoted by the same step numbers. As is apparent from a comparison between FIGS. 13 and 7, compared with the motor control process shown in FIG. 7, the variation is mainly different in that limit control (step 62 in FIG. 13), described hereinafter, is performed in place of the holding control (the step 8 in FIG. 7). The following description is given mainly of different points of the above variation from the motor control process in FIG. 7.

As shown in FIG. 13, in a step 61 replacing the step 2, it is determined whether or not a limit control in-process flag F_LIMITC is equal to 1. The limit control in-process flag F_LIMITC indicates that the limit control is being performed, by 1, and is set by the same method as the method of setting the holding control flag F_HOLDC (see FIG. 9). Therefore, description thereof is omitted.

If the answer to the question of the step 61 is negative (NO), the step 3 et seq. are performed, whereas if the answer to the question of the step 61 is affirmative (YES), i.e. if F_LIMITC=1 holds, the following step 62 and the steps 6 and 7 are performed, whereby the limit control is performed, followed by terminating the present process. The limit control is for making the rate of change in the left-right torque difference ΔTWLR (absolute value, hereinafter referred to as the "left-right torque difference change rate") smaller than the rate of change in the left-right torque sum TTWLR (absolute value, hereinafter referred to as the "left-right torque sum change rate"). In the step 62, the left wheel and right wheel target torques TWLOBJ and TWROBJ are calculated by performing a delta limit process.

In the delta limit process, the left wheel and right wheel target torques TWLOBJ and TWROBJ are calculated such that the left-right torque difference change rate becomes smaller than the left-right torque sum change rate, while maintaining the opposite distribution control. First, a description will be given of the viewpoint of this calculation method.

The absolute value of a difference between the current value (TWLOBJ−TWROBJ) of the above-mentioned left-right target torque difference and the immediately preceding value (TWLOBJZ−TWROBJZ) of the left-right target torque difference corresponds to the left-right torque difference change rate (amount of change in the left-right torque difference ΔTWLR per unit time). Further, the absolute value of a difference between the current value (TWLOBJ+TWROBJ) of the above-described left-right target torque sum and the immediately preceding value (TWLOBJZ+TWROBJZ) of the left-right target torque sum corresponds to the above-mentioned left-right torque sum change rate (amount of change in the left-right torque sum TTWLR per unit time).

Therefore, to make the left-right torque difference change rate smaller than the left-right torque sum change rate, it is only required to calculate the left wheel and right wheel target torques TWLOBJ and TWROBJ such that there holds the following equation (4):

$$|(TWLOBJ-TWROBJ)-(TWLOBJZ-TWROBJZ)| < |(TWLOBJ+TWROBJ)-(TWLOBJZ+TWROBJZ)| \quad (4)$$

As described hereinabove, as is apparent from the fact that the limit control flag F_LIMITC is set similarly to the holding control in-process flag F_HOLDC, the delta limit process in the step 62 is performed during deceleration of the vehicle V. Therefore, (TWLOBJ+TWROBJ)−(TWLOBJZ+TWROBJZ) on the right side of the equation (4) is a negative value, whereas (TWLOBJ−TWROBJ)−(TWLOBJZ−TWROBJZ) on the left side of the equation (4) is a positive value or a negative value depending on the case.

It is therefore only required that the left wheel and right wheel target torques TWLOBJ and TWROBJ are calculated such that in the case where (TWLOBJ−TWROBJ)−(TWLOBJZ−TWROBJZ) is a positive value, TWLOBJ<TWLOBJZ holds from the equation (4), whereas in the case where the same is a negative value, TWROBJ<TWROBJZ holds from the equation (4).

Based on the above viewpoint, the left wheel and right wheel target torques TWLOBJ and TWROBJ are calculated as follows: First, similar to the above-described delta holding process, the immediately preceding value of the left-right target torque difference is calculated (TWLOBJZ−TWROBJZ), and the left-right provisional target torque difference is calculated (TWLPRO−TWRPRO). Then, when the calculated immediately preceding value of the left-right target torque difference and the left-right provisional target torque difference are equal to each other, the left wheel and right wheel provisional target torques TWLPRO and TWRPRO are set as the left wheel and right wheel target torques TWLOBJ and TWROBJ, respectively.

On the other hand, in a case where the immediately preceding value of the left-right target torque difference and the left-right provisional target torque difference are different from each other, when (TWLPRO−TWRPRO)−(TWLOBJZ−TWROBJZ) is a positive value, the left wheel and right wheel target torques TWLOBJ and TWROBJ are calculated based on the above-described viewpoint such that TWLOBJ<TWLOBJZ holds.

Specifically, first, the left wheel target torque TWLOBJ is calculated by subtracting a subtraction term SUB from the immediately preceding value TWLOBJZ of the left wheel target torque. The subtraction term SUB is calculated by searching a predetermined map (not shown) according to the left-right torque sum change amount, the steering angle θ, and so forth. In this map, in order to maintain the opposite distribution control, the subtraction term SUB is set to such a value as will cause the magnitude relationship between the immediately preceding value TWLOBJZ of the left wheel target torque and the immediately preceding value TWROBJZ of the right wheel target torque to be maintained. Further, the above-mentioned left-right torque sum change amount is calculated as the absolute value of a difference between the left-right provisional target torque sum and the immediately preceding value (TWLOBJZ+TWROBJZ) of the left-right target torque sum, and the left-right provisional target torque sum is calculated as the sum of the left wheel provisional target torque TWLPRO and the right wheel provisional target torque TWRPRO (TWLPRO+TWRPRO). Then, a correction addition term ADCR is calculated by subtracting the calculated left wheel target torque TWLOBJ from the left wheel provisional target torque TWLPRO, and the right wheel target torque TWROBJ is calculated by adding the calculated correction addition term ADCR to the right wheel provisional target torque TWRPRO.

On the other hand, in the case where the immediately preceding value of the left-right target torque difference and the left-right provisional target torque difference are different from each other, when (TWLPRO−TWRPRO)−(TWLOBJZ−TWROBJZ) is a negative value, the left wheel and right wheel target torques TWLOBJ and TWROBJ are calculated based on the above-described viewpoint such that TWROBJ<TWROBJZ holds.

Specifically, first, the right wheel target torque TWROBJ is calculated by subtracting the subtraction term SUB calculated as described above from the immediately preceding value TWROBJZ of the right wheel target torque. Then, a correction addition term ADCL is calculated by subtracting the calculated right wheel target torque TWROBJ from the right wheel provisional target torque TWRPRO, and the left wheel target torque TWLOBJ is calculated by adding the calculated correction addition term ADCL to the left wheel provisional target torque TWLPRO.

The left wheel and right wheel target torques TWLOBJ and TWROBJ are calculated by the above-described calculation method such that the left-right torque difference change rate becomes smaller than the left-right torque sum change rate, while holding the left-right target torque sum equal to the left-right provisional target torque sum (TWLPRO+TWRPRO). That is, the left wheel and right wheel target torques TWLOBJ and TWROBJ are calculated such that the left-right torque difference change rate becomes smaller than the left-right torque sum change rate, while maintaining a change in the left-right target torque sum according to traveling states of the vehicle V.

Figure 15:
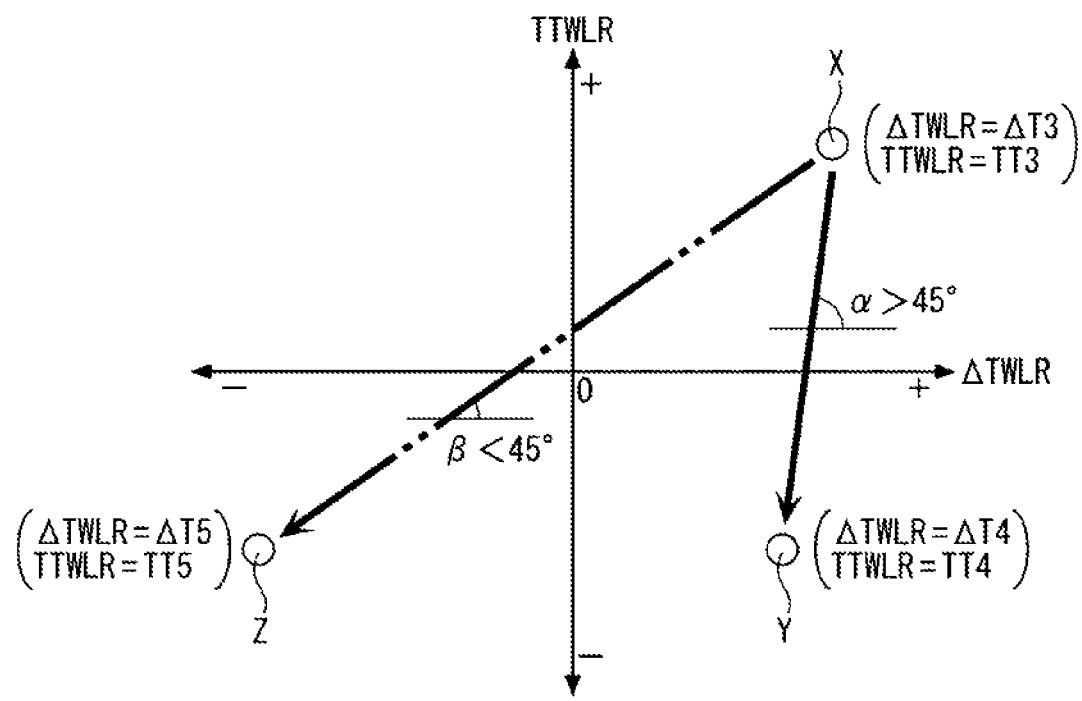
FIG. 15 A diagram showing an example of changes in a left-right torque difference and a left-right torque sum during performance of limit control, together with a comparative example.

Further, FIG. 15 shows an example (arrowed thick solid line) of changes in the left-right torque difference ΔTWLR and the left-right torque sum TTWLR (the sum of the left wheel torque and the right wheel torque) during performance of the above-describe limit control, together with a comparative example (arrowed two-dot chain line). This comparative example shows the case where only the normal control is performed without performing either of the limit control and the shifting control.

As indicated by a white circle X in FIG. 15, at a first timing during performance of the limit control, the left-right torque difference ΔTWLR and the left-right torque sum TTWLR are controlled to a third torque difference ΔT3 and a third torque sum TT3, both of which are positive values, respectively. Further, during performance of the limit control, as indicated by the arrowed thick solid line in FIG. 15, the left-right torque difference ΔTWLR and the left-right torque sum TTWLR are changed with the lapse of a predetermined time period from the first timing. As indicated by a white circle Y in FIG. 15, the left-right torque difference ΔTWLR obtained when the predetermined time period has elapsed from the first timing is a fourth torque difference ΔT4 which is a positive value and also is slightly smaller than the third torque difference ΔT3, while the left-right torque sum TTWLR is a fourth torque sum TT4, which is a negative value.

As shown in FIG. 15, an angle α formed by a line connecting the white circle X and the white circle Y and a horizontal line indicating the magnitude of the left-right torque difference ΔTWLR is larger than 45°. As is apparent from this fact, according to the variation, the rate of change in the left-right torque difference Δ TWLR is smaller than the rate of change in the left-right torque sum TTWLR (|ΔT4−ΔT3|<|TT4−TT3|). Although FIG. 15 shows an example of a case where the rate of change in the left-right torque difference ΔTWLR and the rate of change in the left-right torque sum TTWLR are constant and the line connecting the white circle X and the white circle Y is straight, also in a case where the speeds of changes in the parameters ΔTWLR and TTWLR are changed and the line connecting the white circle X and the white circle Y is curved, similar to the above, the rate of change in the left-right torque difference ΔTWLR becomes smaller than the rate of change in the left-right torque sum TTWLR.

On the other hand, in the comparative example, as indicated by the arrowed two-dot chain line in FIG. 15, the left-right torque difference ΔTWLR and the left-right torque sum TTWLR are reduced from the third torque difference ΔT3 and the third torque sum TT3 (the white circle X) toward a fifth torque difference ΔT5 and a fifth torque sum TT5 (white circle Z), respectively. Similar to the white circle Y, the white circle Z indicates the left-right torque difference ΔTWLR and the left-right torque sum TTWLR obtained during the limit control when the predetermined time period has elapsed from the first timing.

As shown in FIG. 15, an angle β formed by a line connecting the white circle X and the white circle Z and a horizontal line indicating the magnitude of the left-right torque difference ΔTWLR is smaller than 45°. As is apparent from this fact, according to the comparative example, the rate of change in the left-right torque difference ΔTWLR is larger than the rate of change in the left-right torque sum TTWLR (|ΔT5−ΔT3|>|TT5−TT3|).

As described above, according to the variation, the limit control is performed during performance of the opposite distribution control and also during deceleration of the vehicle V (steps 62, 6, and 7), whereby the left wheel torque and the right wheel torque are controlled such that the rate of change in the left-right torque difference Δ TWLR becomes smaller than the rate of change in the left-right torque sum TTWLR. Therefore, similar to the above-described embodiment, it is possible to suppress a change in the yaw moment of the vehicle V when the vehicle V is being decelerated during turning thereof, which in turn makes it possible to stabilize the behavior of the vehicle V. In addition to this, it is possible to obtain the same advantageous effects as provided by the above-described embodiment.

Next, a variation of the flag setting process will be described with reference to FIG. 14. In the figure, the same steps as those in the flag setting process shown in FIG. 9 are denoted by the same step numbers. As is apparent from a comparison between FIGS. 14 and 9, the variation is different only in that steps 71 and 72 are performed in place of the steps 43 and 47, respectively. The following description is given mainly of different points of the above variation from the flag setting process in FIG. 9.

Figure 14:
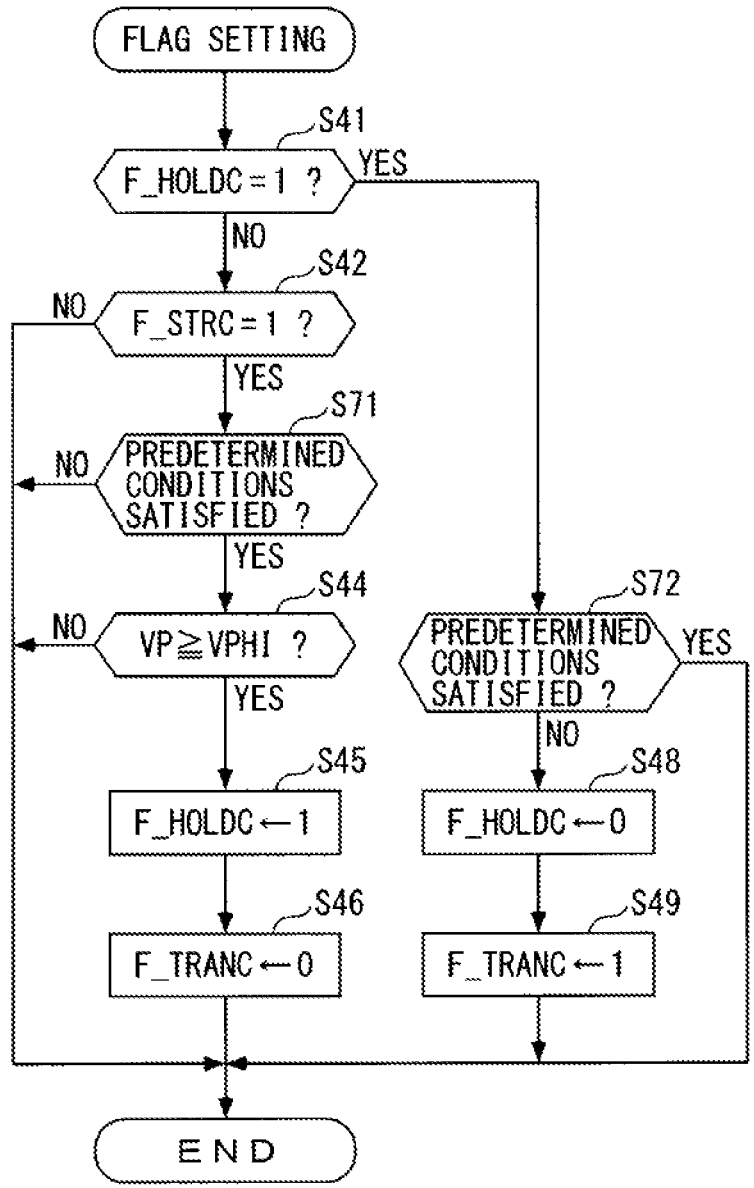
FIG. 14 A flowchart of a variation of the flag setting process.

As shown in FIG. 14, if the answer to the question of the step 42 is affirmative (YES) (F_STRC=1), i.e. if the opposite distribution control is being performed, the step 71 is performed to determine whether or not predetermined conditions are satisfied. The predetermined conditions are conditions that a change in the above-described target torque sum TRT (amount of change per unit time) is not smaller than a first predetermined value, and also a change in the target torque difference ΔTT (amount of change per unit time) is not smaller than a second predetermined value. The change in the target torque sum TRT is calculated as the absolute value of a difference between a current value and an immediately preceding value thereof, and the change in the target torque difference ΔTT is calculated as the absolute value of a difference between a current value and an immediately preceding value thereof. The above-mentioned first and second predetermined values are set as changes in the target torque sum TRT and the change in the target torque difference ΔTT during normal deceleration or acceleration of the vehicle V, respectively.

If the answer to the question of the step 71 is negative (NO), the present process is immediately terminated, whereas if the answer to the question of the step 71 is affirmative (YES), i.e. if the above-described conditions are satisfied, it is judged that deceleration or acceleration of the vehicle V has been started, and the step 44 et seq. are performed.

If the answer to the question of the step 41 is affirmative (YES) (F_HOLDC=1), the step 72 is performed, and similar to the step 71, it is determined whether or not the predetermined conditions are satisfied. If the answer to this question is affirmative (YES), the present process is immediately terminated, whereas if the answer to the question is negative (NO), i.e. if the predetermined conditions are no longer satisfied during performance of the holding control, it is judged that deceleration or acceleration of the vehicle V has been terminated, and to terminate the holding control being performed, the step 48 et seq. are performed (F_HOLDC←0).

As described above, according to the variation, during performance of the opposite distribution control, when the change in the target torque sum TRT is not smaller than the first predetermined value, and also the change in the target torque difference ΔTT is not smaller than the second predetermined value, the holding control is performed. With this, similar to the above-described embodiment, it is possible to suppress a change in the yaw moment of the vehicle V when the vehicle V is being decelerated during turning thereof, which in turn makes it possible to stabilize the behavior of the vehicle V. In addition to this, it is possible to obtain the same advantageous effects as provided by the above-described embodiment.

Note that although in the flag setting process shown in FIG. 14, the holding control flag F_HOLDC is set it is to be understood that the limit control in-process flag F_LIMITC may be set.

Note that the present invention is by no means limited to the above-described embodiment, but it can be practiced in various forms. For example, although in the embodiment, deceleration of the vehicle V is obtained based on the output signal from the brake switch 26, it may be obtained based on a detection signal from an acceleration sensor for detecting deceleration of the vehicle V, based on a detection signal from a sensor for detecting an operation amount of the brake pedal, or based on reduction of an operation amount of the accelerator pedal, detected by a sensor or the like. Alternatively, deceleration of the vehicle V may be predicted based on a detection signal from a slope sensor that detects a slope of a road surface on which the vehicle is traveling, or data stored in a car navigation system provided in the vehicle.

Further, although in the embodiment, in a case where it is determined that the vehicle V is in the high-speed traveling state during performance of the opposite distribution control, the holding control and the limit control are started when deceleration of the vehicle V is obtained (YES to the step 43, YES to the step 71), they may be started irrespective of the vehicle speed VP when deceleration of the vehicle V is obtained during performance of the opposite distribution control. Furthermore, although in the embodiment, the holding control and the limit control are terminated when deceleration of the vehicle V is terminated, they may be terminated when the vehicle speed VP becomes very low. Further, although in the embodiment, the holding control and the limit control are terminated when deceleration of the vehicle V is terminated, they may be terminated when acceleration of the vehicle V is started.

Further, although in the embodiment, during performance of the holding control, the left wheel torque and the right wheel torque are controlled such that the left-right torque difference ΔTWLR is held at the same value as immediately before the start of the holding control, they may be controlled such that the left-right torque difference ΔTWLR is held substantially constant. Further, it is to be understood that the control methods employed in the holding control and the limit control, described in the embodiment, are given only by way of example, and any other suitable control methods can be employed. For example, during performance of the holding control, by setting the target torque difference ΔTT to the same value as immediately before the start of the holding control, the left wheel and right wheel target torques TWLOBJ and TWROBJ may be calculated according to the set target torque difference ΔTT by the calculation method in the steps 24 to 31, 4, and 5, and further the left wheel torque and the right wheel torque may be controlled based on the calculated left wheel and right wheel target torques TWLOBJ and TWROBJ, respectively. Alternatively, by detecting (calculating and estimating) the left wheel torque and the right wheel torque by a sensor or the like, and an actual left-right torque difference change rate and an actual left-right torque sum change rate may be calculated based on the detected left wheel torque and right wheel torque, and the left wheel torque and the right wheel torque may be controlled such that the calculated left-right torque difference change rate become smaller than the calculated left-right torque sum change rate.

Furthermore, although in the embodiment, by performing the shifting control after termination of the holding control and the limit control, the left wheel torque and the right wheel torque are calculated such that they are progressively returned from values to which they have been controlled at the end of the holding control and the limit control, to values to which they are controlled by the normal control, the left wheel torque and the right wheel torque may be calculated such that they are instantly returned to the values to which they are controlled by the normal control.

Further, although in the embodiment, a left-right motive power difference of the present invention is the left-right torque difference ΔTWLR (difference between the left wheel torque and the right wheel torque), the left-right motive power difference may be a ratio between the left wheel torque and the right wheel torque. Furthermore, although in the embodiment, a left driving force and a right driving force of the present invention are the left wheel torque and the right wheel torque, respectively, the left driving force and the right driving force may be a left wheel driving force and a right wheel driving force which can be calculated from the left wheel torque and the right wheel torque.

Further, although in the embodiment, the rear wheel drive device DRS including the first and second rear motors 41 and 61 is used as the drive device of the present invention, there may be used any other suitable drive device which is capable of changing a left-right driving force sum and the left-right driving force difference independently of each other by adjusting the left driving force and the right driving force. For example, there may be used a drive device which includes e.g. a hydraulic motor and a planetary gear unit disclosed in Japanese Laid-Open Patent Publication (Kokai) No. H08-207542 by the present applicant, a drive device which includes two brakes and a planetary gear unit disclosed in Japanese Patent Publication No. 3104157 by the present applicant, a drive device which includes a clutch that connects left and right wheels to each other via a planetary gear unit, etc. Furthermore, although in the embodiment, the left and right wheels of the present invention are the left and right rear wheels WRL and WRR, they may be the left and right front wheels WFL and WFR.

Further, although in the embodiment, the control system according to the present invention is applied to the vehicle V, which is an all-wheel drive (AWD) vehicle V, by way of example, it is to be understood that the control system may be applied to a vehicle, such as a two-wheel drive (2WD) vehicle, which includes a plurality of wheels, some of which are driven. Further, the number of the wheels is not limited to four but it can be a desired number. Further, although in the embodiment, the vehicle of the present invention is the vehicle V, it may be a boat or an aircraft. In a case where the vehicle is a boat, the left and right driving parts are left and right screws for propelling the boat. In a case where the vehicle is an aircraft, the left and right driving parts are left and right propellers for propelling the aircraft. Further, it is to be understood that the variations of the above embodiment may be combined, as required. It is further understood by those skilled in the art that the foregoing are preferred embodiments of the invention, and that various changes and modifications may be made without departing from the spirit and scope thereof.

REFERENCE SIGNS LIST

V vehicle (vehicle)
WRL left rear wheel (left driving part, left wheel)
WRR right rear wheel (right driving part, right wheel)
DRS rear wheel drive device (drive device)
1 control system
2 ECU (controller, target value calculator, deceleration obtainer, computer)
2a ROM (recording medium)
21 vehicle speed sensor (speed obtainer movement state obtainer, control parameter obtainer)
22 steering angle sensor (movement state obtainer control parameter obtainer)
23 lateral acceleration sensor (movement state obtainer, control parameter obtainer)
24 yaw moment sensor (movement state obtainer control parameter obtainer)
25 accelerator pedal opening sensor (control parameter obtainer)
26 brake switch (deceleration obtainer)
41 first rear motor (left rotating electric machine)
61 second rear motor (right rotating electric machine)
VP vehicle speed (traveling speed of vehicle, movement state of vehicle, control parameter)
θsteering angle (movement state of vehicle, control parameter)
GL lateral acceleration (movement state of vehicle, control parameter)
YM yaw moment (movement state of vehicle, control parameter)
AP accelerator pedal opening (control parameter)
TRT target torque sum (left-right sum target value)
ΔTT target torque difference (left-right difference target value)
TWLPRO left wheel provisional target torque (value controlled by normal control)
TWRPRO right wheel provisional target torque (value controlled by normal control)
TWLOBJZ immediately preceding value (value having been controlled at the end of limit control)
TWROBJZ immediately preceding value (value having been controlled at the end of limit control)
VPHI high vehicle speed (predetermined speed)
TTWLR left-right torque sum (left-right driving force sum)
ΔTWLR left-right torque difference (left-right driving force difference)

The invention claimed is:

1. A control system for a driving device that is capable of adjusting a left driving force, which is a driving force of a left driving part for propelling a vehicle, arranged on a left side of the vehicle with respect to a traveling direction of the vehicle, and a right driving force, which is a driving force of a right driving part for propelling the vehicle, arranged on a right side of the vehicle with respect to the traveling direction of the vehicle, thereby changing a left-right driving force sum, which is a sum of the left driving force and the right driving force, and a left-right driving force difference, which is a difference between the left driving force and the right driving force, independently of each other, the control system comprising:
a processor for performing an opposite distribution control for generating the left-right driving force difference by controlling the left driving force and the right driving force via the driving device such that a yaw moment in a direction opposite to a turning direction of the vehicle acts on the vehicle; and
said processor for obtaining deceleration of the vehicle,
wherein during performance of the opposite distribution control, when the deceleration of the vehicle is obtained, said processor performs a limit control for controlling the left driving force and the right driving force such that a change in the left-right driving force difference becomes smaller than a change in the left-right driving force sum.

2. The control system for a driving device according to claim 1, further comprising a sensor for obtaining a traveling speed of the vehicle, and
wherein during performance of the opposite distribution control, in a case where the obtained traveling speed of the vehicle is not lower than a predetermined speed, said processor starts the limit control when the deceleration of the vehicle is obtained.

3. The control system for a driving device according to claim 1, wherein said processor controls the left driving force and the right driving force, as the limit control, such that the left-right driving force difference is held substantially constant.

4. The control system for a driving device according to claim 1, wherein said processor further obtains termination of the deceleration of the vehicle or acceleration of the vehicle, and
wherein said processor continues the limit control until the termination of the deceleration of the vehicle or the acceleration of the vehicle is obtained.

5. The control system for a driving device according to claim 1, further comprising a sensor for obtaining a movement state of the vehicle, and
wherein after termination of the limit control, said processor controls the left driving force and the right driving force such that the left driving force and the right driving force are progressively returned from values to which the left driving force and the right driving force have been controlled at an end of the limit control to values to which the left driving force and the right driving force are controlled by normal control according to the obtained movement state of the vehicle.

6. The control system for a driving device according to claim 1, wherein the vehicle is a vehicle, and
wherein the left and right driving parts are left and right wheels of the vehicle.

7. The control system for a driving device according to claim 1, wherein the driving device includes a left rotating electric machine and a right rotating electric machine connected to the left driving part and the right driving part, respectively.

8. A control system for a driving device that is capable of adjusting a left driving force, which is a driving force of a left driving part for propelling a vehicle, arranged on a left side of the vehicle with respect to a traveling direction of the vehicle, and a right driving force, which is a driving force of a right driving part for propelling the vehicle, arranged on a right side of the vehicle with respect to the traveling direction of the vehicle, thereby changing a left-right driving force sum, which is a sum of the left driving force and the right driving force, and a left-right driving force difference, which is a difference between the left driving force and the right driving force, independently of each other,
the control system comprising:
a sensor for obtaining a control parameter indicative of at least one of a movement state of the vehicle and a demand from an operator of the vehicle;
a processor for calculating a left-right difference target value, which is a target value of the left-right driving force difference, and a left-right sum target value, which is a target value of the left-right driving force sum, based on the obtained control parameter; and
said processor for controlling the left driving force and the right driving force according to the calculated left-right difference target value and left-right sum target value,
wherein said processor performs, according to the left-right difference target value, an opposite distribution control for generating the left-right driving force difference by controlling the left driving force and the right driving force via the driving device such that a yaw moment in a direction opposite to a turning direction of the vehicle acts on the vehicle, and
wherein during performance of the opposite distribution control, when both a change in the left-right difference target value and a change in the left-right sum target value are obtained, said processor performs a limit control for controlling the left driving force and the right driving force such that a change in the left-right driving force difference becomes smaller than a change in the left-right driving force sum.

9. A control method for a driving device that is capable of adjusting a left driving force, which is a driving force of a left driving part for propelling a vehicle, arranged on a left side of the vehicle with respect to a traveling direction of the vehicle, and a right driving force, which is a driving force of a right driving part for propelling the vehicle, arranged on a right side of the vehicle with respect to the traveling direction of the vehicle, thereby changing a left-right driving force sum, which is a sum of the left driving force and the right driving force, and a left-right driving force difference, which is a difference between the left driving force and the right driving force, independently of each other,
the control method comprising:
a step of performing an opposite distribution control for generating the left-right driving force difference by controlling the left driving force and the right driving force via the driving device such that a yaw moment in a direction opposite to a turning direction of the vehicle acts on the vehicle;
a step of obtaining deceleration of the vehicle; and
a step of performing, during performance of the opposite distribution control, when the deceleration of the vehicle is obtained, a limit control for controlling the left driving force and the right driving force such that a change in the left-right driving force difference becomes smaller than a change in the left-right driving force sum.

10. A non-transitory recording medium in which is recorded a program for causing a computer to perform a control process for controlling a driving device that is capable of adjusting a left driving force, which is a driving force of a left driving part for propelling a vehicle, arranged on a left side of the vehicle with respect to a traveling direction of the vehicle, and a right driving force, which is a driving force of a right driving part for propelling the vehicle, arranged on a right side of the vehicle with respect to the traveling direction of the vehicle, thereby changing a left-right driving force sum, which is a sum of the left driving force and the right driving force, and a left-right driving force difference, which is a difference between the left driving force and the right driving force, independently of each other,
the control process comprising:
a step of performing an opposite distribution control for generating the left-right driving force difference by controlling the left driving force and the right driving force via the driving device such that a yaw moment in a direction opposite to a turning direction of the vehicle acts on the vehicle;
a step of obtaining deceleration of the vehicle; and
a step of performing, during performance of the opposite distribution control, when the deceleration of the vehicle is obtained, a limit control for controlling the left driving force and the right driving force such that a change in the left-right driving force difference becomes smaller than a change in the left-right driving force sum.

* * * * *